United States Patent
Mills et al.

(10) Patent No.: US 8,197,872 B2
(45) Date of Patent: Jun. 12, 2012

(54) HUMAN MILK OLIGOSACCHARIDES TO PROMOTE GROWTH OF BENEFICIAL GUT BACTERIA

(75) Inventors: David A. Mills, Davis, CA (US); Carlito B. Lebrilla, Davis, CA (US); Riccardo LoCascio, Ridgewood, NJ (US); Milady Ninonuevo, Davis, CA (US); J. Bruce German, Davis, CA (US); Samara Freeman, Davis, CA (US)

(73) Assignee: The Regents of the University of California, Oakland, CA (US)

( * ) Notice: Subject to any disclaimer, the term of this patent is extended or adjusted under 35 U.S.C. 154(b) by 631 days.

(21) Appl. No.: 12/121,683

(22) Filed: May 15, 2008

(65) Prior Publication Data

US 2009/0098240 A1 Apr. 16, 2009

Related U.S. Application Data

(60) Provisional application No. 60/938,615, filed on May 17, 2007.

(51) Int. Cl.
*A23G 4/10* (2006.01)
(52) U.S. Cl. ............... 426/3; 426/580; 426/61; 426/583
(58) Field of Classification Search ............... 426/3, 580, 426/61, 583
See application file for complete search history.

(56) References Cited

U.S. PATENT DOCUMENTS

| | | | |
|---|---|---|---|
| 4,919,961 A | | 4/1990 | Lundblad |
| 6,045,854 A | * | 4/2000 | Prieto et al. ............ 426/658 |
| 6,083,934 A | * | 7/2000 | Prieto et al. ............ 514/61 |

FOREIGN PATENT DOCUMENTS

EP 1887017 A1 2/2008

OTHER PUBLICATIONS

Thurl, S. et al. 1996. Quantification of individual oligosaccharide compounds from human milk using high-pH anion-exchange chromatography. Ana. Biochem. 235: 202-206.*
Bode, Lars; "Recent Advances on Structure, Metabolism, and Function of Human Milk Oligosaccharides"; 2006, *J. Nutr.*, vol. 136, No. 8, pp. 2127-2130.
Chaturvedi, Prasoon et al.; "Fucosylated human mil oligosaccharides vary between individuals and over the course of lactation"; 2001, *Glycobiology*, vol. 11, No. 5, pp. 365-372.
Coppa, Giovanni, V. et al.; "The First prebiotics in Humans—Human Milk Oligosaccharides"; 2004, *Journal of Clinical Gastroenterology*, vol. 38, No. 6, pp. S80-S83.
Hartemink, R. et al.; "Growth of Enterobacteria on Fructo-Oligosaccharides"; 1997, *Journal of Applied Microbiology*, vol. 83, No. 3, pp. 367-374.
Locascio, Riccardo, G. et al.; "Glycoprofiling of Bifidobacterial Consumption of Human Milk Oligosacc Specific, Preferential Consumption of Small Chain Glycans Secreted in E"; 2007, *J. Agric. Food Chem.*, vol. 55, No. 22, pp. 8914-8919.

(Continued)

*Primary Examiner* — D. Lawrence Tarazano
*Assistant Examiner* — Hamid R Badr
(74) *Attorney, Agent, or Firm* — Kilpatrick Townsend & Stockton LLP

(57) ABSTRACT

The present invention provides prebiotic and probiotic compositions containing human milk oligosaccharides and methods of use that selectively promote the growth of beneficial gut bacteria.

20 Claims, 28 Drawing Sheets

Representative HMO structures consumed by B. longum bv. infantis

LACTO-N-TETRAOSE $[M + Na]^+ = 732.3$

LACTO-N-NEOHEXAOSE $[M + Na]^+ = 1097.4$

OTHER PUBLICATIONS

Newburg, David, S. et al.; "Human Milk Glycans Protect Infants Against Enteric Pathogens"; 2005, *Annual Review of Nutrition*, vol. 25, pp. 37-58.

Ninonuevo, Milady R. et al.; "Quantitation of Oligosaccharides in Human Milk using Deuterium Labeled Standard"; 2005, *Department of Chemistry, University of California, Davis*, 3 pages.

Ninonuevo, Milady, R. et al.; "A Strategy for Annotating the Human Milk Glycome"; 2006, *Journal of Agricultural and Food Chemistry*, vol. 54, No. 20, pp. 7471-7480.

Ninonuevo, Milady, R. et al.; "High Performance Profiling and Quantitation of Oligosaccharides in Human Mill Microfluidic Chips with High Mass Accuracy Time-of-Flight Mass Spectrometry"; 2007, 2007, 55th ASMS Conference Proceedings, 2 pages.

Ninonuevo, Milady R. et al.; "Methods for the quantitation of human milk oligosaccharides in bacterial fermentation by mass spectrometry"; 2006, 2007, Analytical Biochemistry, vol. 361, No. 1, pp. 15-23.

Ninonuevo, Milady, R. et al.; "Daily Variations in Oligosaccharides of Human Milk Determined by Mic Spectrometry"; 2008, J. Agric. Food Chem., vol. 56, No. 2, pp. 618-626.

Ward, Robert, E. et al.; "In Vitro Fermentation of Breast Milk Oligosaccharides by *Bifidobacterium* Infants and *Lactobacillus gasseri*"; 2006, *Appl. Environ. Microbiol.*, vol. 72, No. 6, pp. 4497-4499.

* cited by examiner

FIG. 1B  m/z 732.3    At 0 hr.
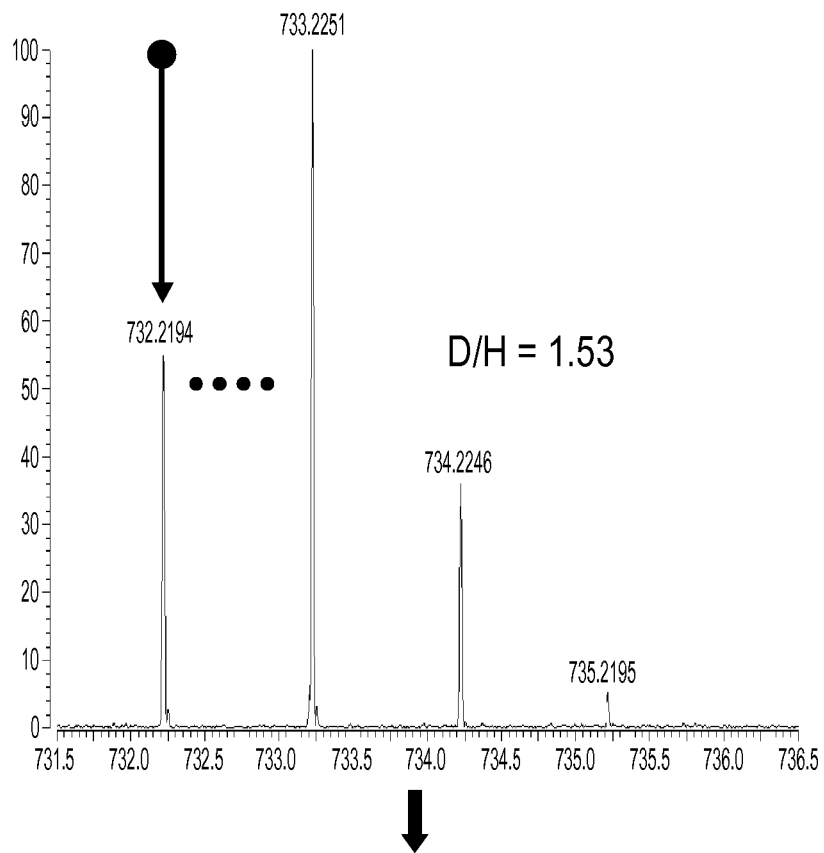
D/H = 1.53
At 148 hrs.
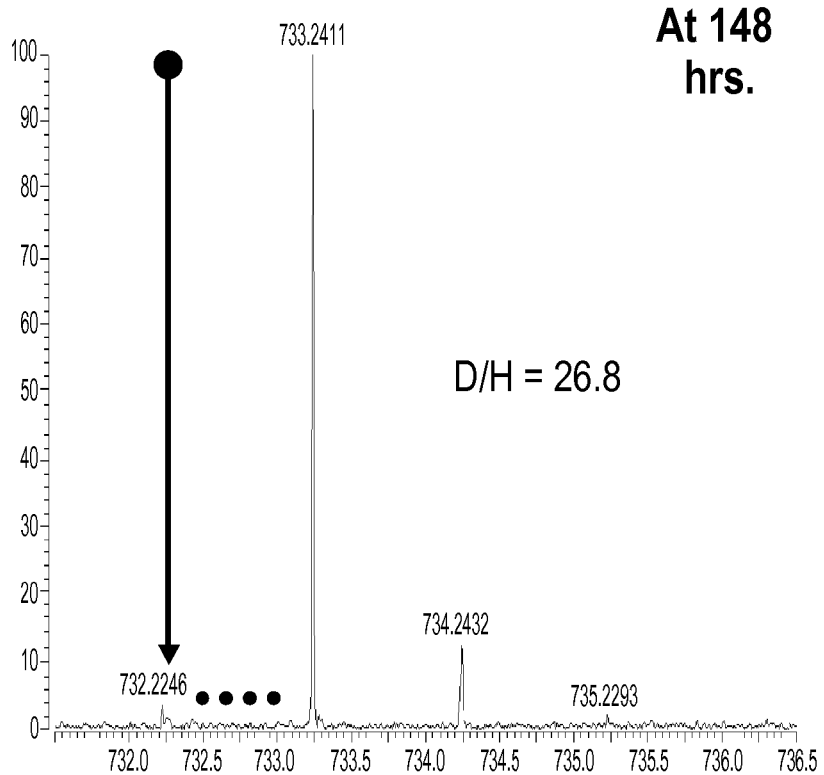
D/H = 26.8

FIG .1C  *m/z* 1097.4
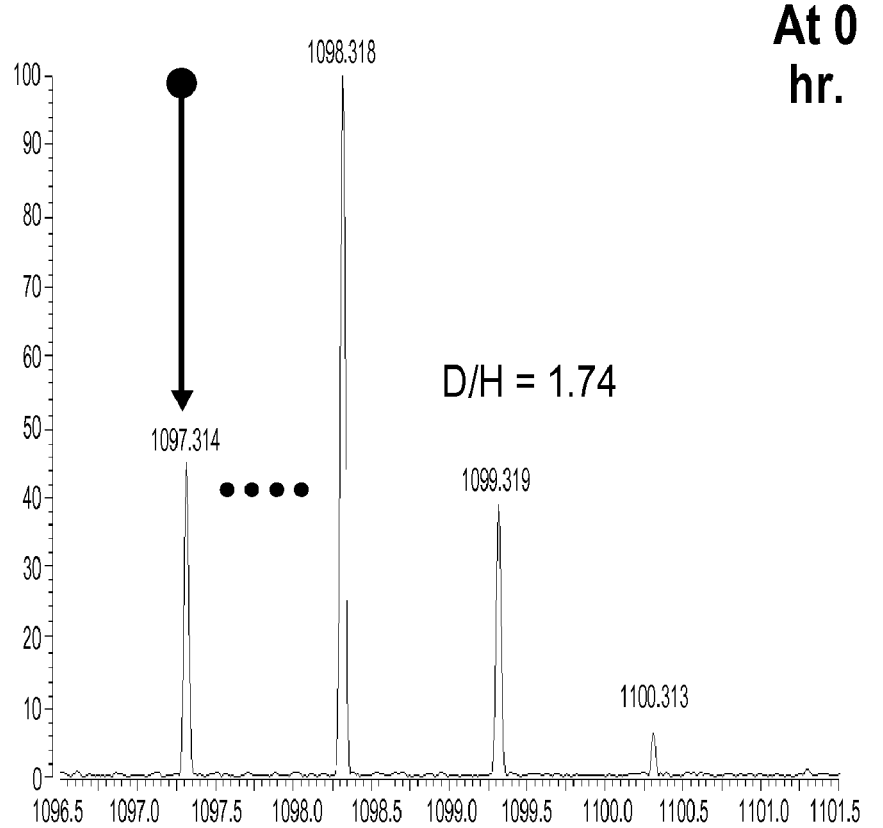
At 0 hr.
D/H = 1.74
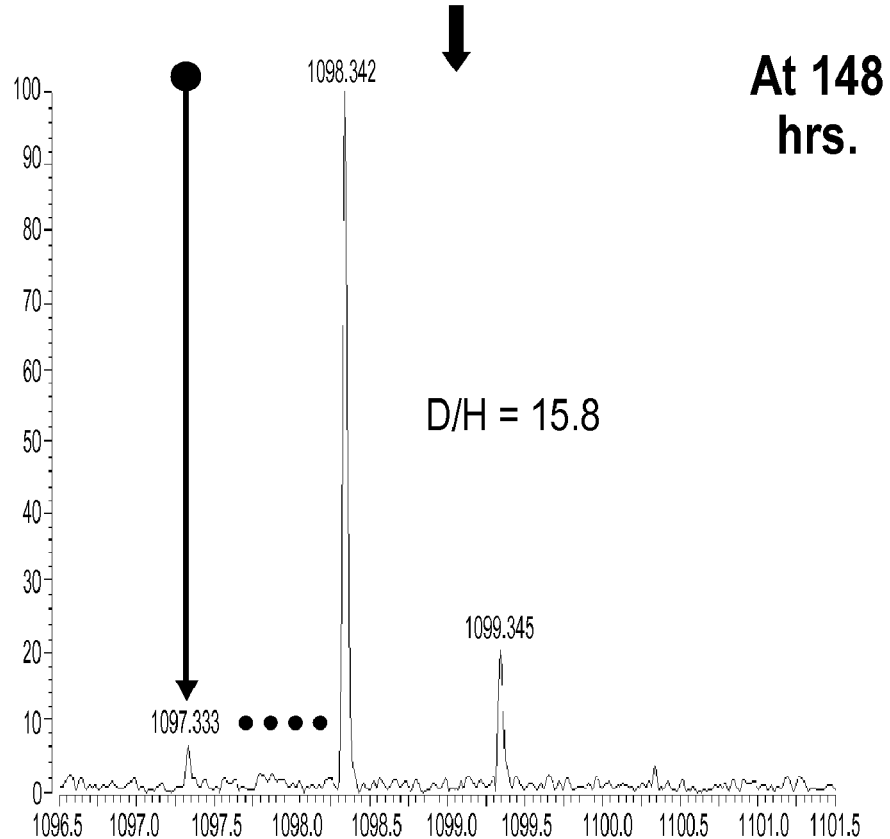
At 148 hrs.
D/H = 15.8

*Bifidobacterium longum*

*Bifidobacterium breve*

Representative HMO structures consumed by *B. longum* bv. *infantis*

Isomers for [M + Na]⁺ = 878.3

LACTO-N-FUCOPENTAOSE III

LACTO-N-FUCOPENTAOSE I

3 Hex
1 HexNAc
1Fuc

LACTO-N-FUCOPENTAOSE V

LACTO-N-FUCOPENTAOSE II

PARA-LACTO-N-NEOHEXAOSE

PARA-LACTO-N-HEXAOSE

Isomers for [M + Na]$^+$ = 1243.4

MONOFUCOSYLLACTO-N-HEXAOSE II

4 Hex
2 HexNAc
1 Fuc

Isomeric Fucosylated LACTO-N-HEXAOSE (1)

MONOFUCOSYLLACTO-N-HEXAOSE

Isomeric Fucosylated LACTO-N-HEXAOSE (3)

Isomeric Fucosylated LACTO-N-HEXAOSE (2)

DIFUCOSYL-N-HEXAOSE

4 Hex
2 Hex NAc
2 Fuc

Isomers for [M + Na]$^+$ = 1462.5

LACTO-N-NEOOCATAOSE

5 Hex
3 HexNAc

PARA-LACTO-N-NEOOCATAOSE

ISO-LACTO-N-OCATAOSE

LACTO-N-OCATAOSE

FIG. 13  Isomers for [M + Na]$^+$ = 1754.6
DIFUCOSYLLACTO-N-OCTAOSE I
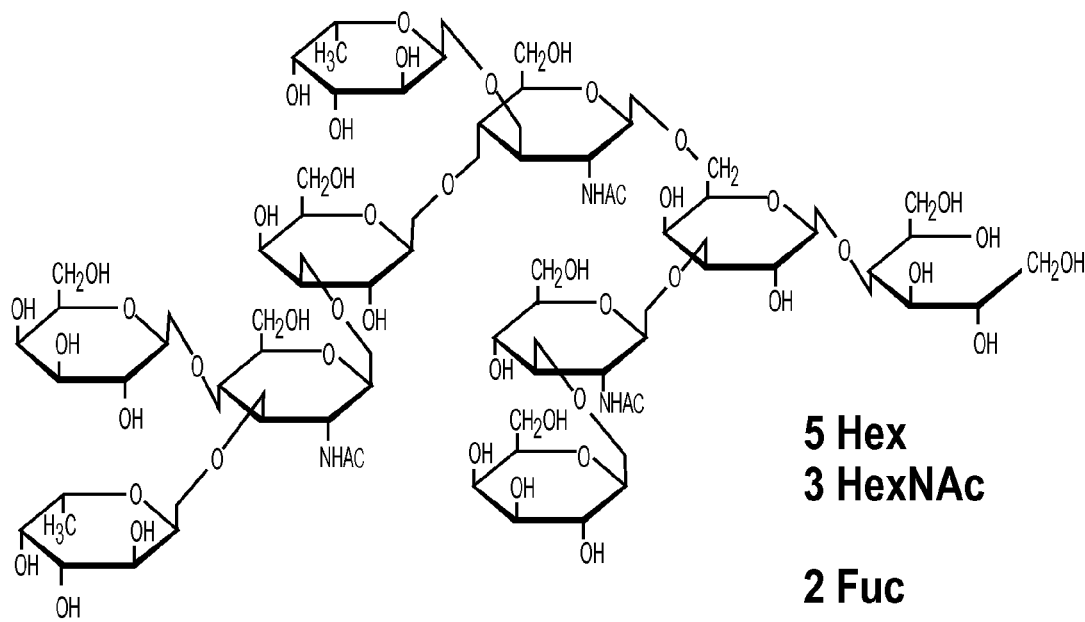
5 Hex
3 HexNAc
2 Fuc
DIFUCOSYLLACTO-N-OCTAOSE II
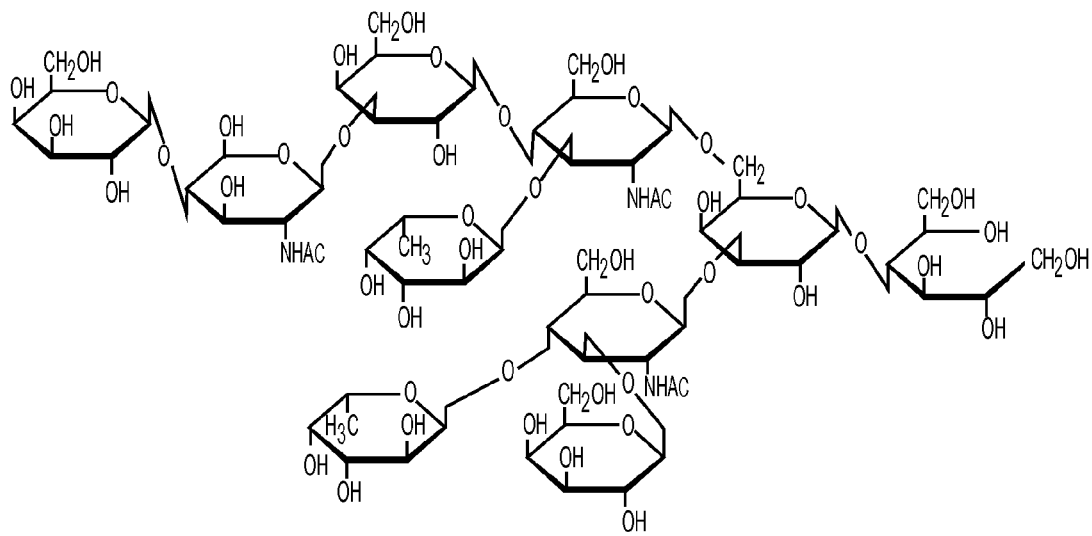

DIFUCOSYLLACTO-N-NEOOCTAOSE II

DIFUCOSYLLACTO-N-NEOOCTAOSE I

Isomers for [M + Na]⁺ = 1827.6

LACTO-N-DECAOSE

6 Hex
4 HexNAc

Isomers for [M + Na]$^+$ = 1900.7

TRIFUCOSYLLACTO-N-NEOOCTAOSE

5 Hex
3 HexNAc
3 Fuc

TRIFUCOSYLLACTO-N-OCTAOSE

TRIFUCOSYL-ISO-LACTO-N-OCTAOSE

HUMAN MILK OLIGOSACCHARIDES TO PROMOTE GROWTH OF BENEFICIAL GUT BACTERIA

CROSS-REFERENCES TO RELATED APPLICATIONS

The present patent application claims benefit of priority to U.S. Provisional Patent Application No. 60/938,615, filed May 17, 2007, which is incorporated by reference.

BACKGROUND OF THE INVENTION

The adult human has about $10^{14}$ microorganisms that normally reside in the digestive tract that make up the gut flora. The intestinal bacteria that make up the normal flora of the digestive tract have a symbiotic or mutualistic relationship with their human hosts by performing a variety of beneficial functions such as breaking down and aiding in the absorption of otherwise undigestible food, stimulating cell growth, repressing the growth of harmful bacteria, training the immune system to respond to pathogens, and defending against some diseases.

In contrast, the human infant is born with a digestive tract essentially free of bacteria. However, soon after birth, bacteria begin colonizing an infant's digestive tract. The first bacteria to be established in the gut affect the immune response, making the gut environment more favorable to their own survival and less favorable to competing species; thus the first bacteria to colonize the gut are important in determining the person's lifelong gut flora makeup. Thus, for example, intestinal bacteria play an important role in promoting the early development and later functioning of the gut's mucosal immune system. These bacteria stimulate lymphoid tissue associated with the gut mucosa to produce antibodies to pathogens. During this process, the immune system is trained to recognize harmful bacteria, while leaving helpful species of bacteria unaffected, a tolerance developed in infancy.

The gut flora can be perturbed or completely lost in adulthood as a result of antibiotic therapy, chemotherapy, disease, or other causes.

Among the bacterial genera found in the gut are *Bacteroides*, *Clostridium*, *Fusobacterium*, *Eubacterium*, *Ruminococcus*, *Peptococcus*, *Peptostreptococcus*, *Bifidobacterium*, *Escherichia*, and *Lactobacillus*, among others. Among these species, Bifidobacteria are noteworthy because it has recently been found that this genera of bacteria is responsible for digesting unique oligosaccharides found in human milk. Estimates indicate that about 40-97% of these oligosaccharides pass through the human infant digestive tract undigested. It has been suggested that these oligosaccharides found in human milk serve as a prebiotic: a non-digestible food ingredient that beneficially affects the host by selectively stimulating the growth and/or the activity of one or a limited number of bacteria in the gastrointestinal tract. Thus, the one function of the oligosaccharides in human milk is to promote the colonization of the infant gut by beneficial bacteria such as Bifidobacteria.

Given the importance of proper bacterial colonization of the gut for general health and well being, as well as disease prevention, especially in infants and those with compromised intestinal flora, compositions and methods that promote the growth of beneficial bacteria in the gut are desirable. The present invention satisfies these and other needs.

BRIEF SUMMARY OF THE INVENTION

Prior to the work described herein, the molecular basis by which human breast milk supports the development of a protective intestinal microbiome in infants was unknown. After lactose and lipids, human milk oligosaccharides (HMOs) are quantitatively the third largest and most diverse component of breast milk. In this work, we have demonstrated, using high resolution Fourier transform ion cyclotron resonance mass spectrometry (FTICR-MS) glycomic profiling of HMO consumption by bifidobacterial, that one species, *Bifidobacterium longum* biovar *infantis* ATCC 15697, an isolate from the infant gut, preferentially consumes small mass oligosaccharides, representing 63.9% of the total HMOs available. These HMOs were detected by high performance liquid chromatography-chip time-of-flight mass spectrometry (HPLC-Chip TOF MS) in human breast milk at the onset and constantly through the first month of lactation. Further characterization revealed that strain ATCC 15697 possesses both fucosidase and sialidase activities not present in the other tested strains. This work illustrates that these small mass HMOs are a new class of bioactive molecules functioning as prebiotics for bifidobacterial strains to facilitate a protective gut colonization in newborns.

The present invention provides synthetic prebiotic compositions comprising a first, second and third purified oligosaccharide each of which naturally occur in human breast milk, wherein
the first oligosaccharide has a charge/mass (m/z) ratio of about 732.3;
the second oligosaccharide has a charge/mass (m/z) ratio of about 1243.4; and
the third oligosaccharide has a charge/mass (m/z) ratio of about 1389.5.

In some embodiments, the first oligosaccharide is selected from the group consisting of Lacto-N-tetraoase and Lacto-N-neotetraose;
the second oligosaccharide is selected from the group consisting of Monofucosyllacto-N-hexaose, Isomeric Fucosylated Lacto-N-hexaose (1), Isomeric Fucosylated Lacto-N-hexaose (2), Isomeric Fucosylated Lacto-N-hexaose (3); and
the third oligosaccharide is selected from the group consisting of Difucosyl-para-lacto-neohexaose, Difucosyl-para-lacto-hexaose, and Difucosyllacto-hexaose.

In some embodiments, the compositions further comprise a fourth oligosaccharide that naturally occurs in human breast milk and has a charge/mass (m/z) ratio of about 1097.4. In some embodiments, the fourth oligosaccharide is selected from the group consisting of Lacto-N-hexaose, Lacto-N-neohexaose, Para-lacto-hexaose, and Para-lacto-neohexaose In some embodiments, the compositions further comprise a fifth oligosaccharide (and optionally do not include the fourth oligosaccharide) that naturally occurs in human breast milk and has a charge/mass (m/z) ratio of about 878.3. In some embodiments, the fifth oligosaccharide is selected from the group consisting of Lacto-N-fucopentaose I, Lacto-N-fucopentaose II, Lacto-N-fucopentaose III, and Lacto-N-fucopentaose IV.

In some embodiments, the compositions further comprise an inoculum of *Bifidobacterium infantis*.

In some embodiments, the composition further comprises a bovine milk protein, a soy protein, betalactoglobulin, whey, soybean oil or starch.

In some embodiments, said prebiotic composition is in the form of a powder, a tablet, a capsule, a lozenge, a chewing gum, a food product, or a supplemented beverage. In some embodiments, said supplemented beverage is a member selected from the group consisting of an infant formula, follow-on formula, toddler's beverage, milk, fruit juice, and fruit-based drink.

In some embodiments, said first, second, and third oligosaccharide are each at a concentration of 100 micrograms/L to 25 grams/L.

The present invention also provides a synthetic prebiotic composition comprising a purified oligosaccharide that naturally occurs in human breast milk, wherein the oligosaccharide has a mass/charge (m/z) ratio selected from the group about 878.3, about 1097.4, about 1243.4, about 1389.5, about 1462.5, about 1608.6, about 1754.6, about 1827.6, and about 1900.7. In some embodiments, the oligosaccharides are selected from the group consisting of Lacto-N-Tetraose, Lacto-N-Neotetraose, Lacto-N-Fucopentaose I, Lacto-N-Fucopentaose II, Lacto-N-Fucopentaose III, Lacto-N-Fucopentaose V, Lacto-N-Hexaose, Para-Lacto-N-Hexaose, Lacto-N-Neohexaose, Para-Lacto-N-Neohexaose, Monofucosyllacto-N-Hexaose II, Isomeric Fucosylated Lacto-N-Hexaose (1), Monofucosyllacto-N-Hexaose, Isomeric Fucosylated Lacto-N-Hexaose (3), Isomeric Fucosylated Lacto-N-Hexaose (2), Difucosyl-Para-Lacto-N-Neohexaose, Difucosyl-Para-Lacto-N-Hexaose, Difucosyllacto-N-Hexaose, Lacto-N-Neoocataose, Para-Lacto-N-Octanose, Iso-Lacto-N-Octaose, Lacto-N-Octaose, Monofucosyllacto-Nneoocataose, Monofucosyllacto-N-Ocataose, Difucosyllacto-N-Octaose I, Difucosyllacto-N-Octaose II, Difucosyllacto-N-Neoocataose II, Difucosyllacto-N-Neoocataose I, Lacto-N-Decaose, Trifucosyllacto-N-Neooctaose, Trifucosyllacto-N-Octaose and Trifucosyl-Iso-Lacto-N-Octaose. In some embodiments, the compositions comprise at least two, at least three, at least four or at least five selected from the group.

In some embodiments, the compositions, further comprise an inoculum of *Bifidobacterium infantis*.

The present invention also provides methods of producing a synthetic prebiotic food product or food supplement. In some embodiments, the methods comprise combining at least one food ingredient with the first and second and third oligosaccharide as described above, thereby generating a probiotic food product or food supplement.

In some embodiments, the food ingredient comprises a bovine milk protein, a soy protein, betalactoglobulin, whey, soybean oil or starch. In some embodiments, the method further comprises combining an inoculum of *Bifidobacterium infantis* with the food ingredient and/or first and second and third oligosaccharide.

In some embodiments, at least one of the first, second and third oligosaccharides are synthesized before the combining step. In some embodiments, at least one of the first, second and third oligosaccharides are purified before the combining step.

In some embodiments, the present invention provides a prebiotic composition comprising at least one oligosaccharide which can include: isomeric fucosylated lacto-N-hexaose, and difucosyllacto-N-hexaose, Lacto-N-Fucopentaose I, II, III, or V, Lacto-N-Neohexaose, Lacto-N-Hexaose, Para-Lacto-N-Hexaose, Para-Lacto-N-Neohexaose, Monofucosyllacto-N-Hexaose I or II, Isomeric Fucosylated Lacto-N-Hexaose 1 or 3, Monofucsyllacto-N-Neoexaose, Difucosyl-Para-Lacto-N-Neohexaose, and Difucosyl-Para-Lacto-N-Hexaose. In some embodiments, the prebiotic composition can comprise at least two, at least three, at least four, at least five, or at least six or more of these oligosaccharides.

In some embodiments, the present invention provides a prebiotic composition comprising at least two or more oligosaccharides which can include: lacto-N-neohexaose, isomeric fucosylated lacto-N-hexaose, and difucosyllacto-N-hexaose, Lacto-N-Fucopentaose I, II, III, or V, Lacto-N-Neohexaose, Lacto-N-Hexaose, Para-Lacto-N-Hexaose, Para-Lacto-N-Neohexaose, Monofucosyllacto-N-Hexaose I or II, Isomeric Fucosylated Lacto-N-Hexaose 1 or 3, Monofucsyllacto-N-Neoexaose, Difucosyl-Para-Lacto-N-Neohexaose, and Difucosyl-Para-Lacto-N-Hexaose. In some embodiments, the prebiotic composition can comprise at least three, at least four, at least five, or at least six or more of these oligosaccharides.

In some embodiments, the present invention provides a probiotic composition comprising an inoculum of *Bifidobacterium infantis* and at least one oligosaccharide which can include: lacto-N-tetraose, lacto-N-neohexaose, isomeric fucosylated lacto-N-hexaose, difucosyllacto-N-hexaose, Lacto-N-Fucopentaose I, II, III, or V, Lacto-N-Neohexaose, Lacto-N-Hexaose, Para-Lacto-N-Hexaose, Para-Lacto-N-Neohexaose, Monofucosyllacto-N-Hexaose I or II, Isomeric Fucosylated Lacto-N-Hexaose 1 or 3, Monofucsyllacto-N-Neoexaose, Difucosyl-Para-Lacto-N-Neohexaose, and Difucosyl-Para-Lacto-N-Hexaose. In embodiments, the probiotic composition can comprise at least two, at least three, at least four, at least five, or at least six or more of these oligosaccharides.

In some embodiments, the prebiotic compositions further comprise an inoculum of *Bifidobacterium infantis*.

In some embodiments, the prebiotic or probiotic compositions of the invention are in the form of a tablet, a capsule, a lozenge, a chewing gum, a food product, or a supplemented beverage. Examples of supplemented beverages include infant formula, follow-on formula, a toddler's beverage, milk, fruit juice, and fruit-based drinks. In these embodiments, the supplemented beverage can contain oligosaccharides at a concentration of 100 micrograms/L to 25 grams/L.

In some embodiments, the prebiotic or probiotic composition is a food product such as baby food, yogurt, or candy. In such food products, the oligosaccharide can be present, for example, at a concentration of 100 micrograms/L to 25 grams/L.

In some embodiments, the present invention provides a method of promoting the growth of *Bifidobacterium infantis* in an infant's gastrointestinal tract by the administration of an effective amount of at least one oligosaccharide selected from the group consisting of isomeric fucosylated lacto-N-hexaose, and difucosyllacto-N-hexaose, Lacto-N-Fucopentaose I, II, III, or V, Lacto-N-Neohexaose, Lacto-N-Hexaose, Para-Lacto-N-Hexaose, Para-Lacto-N-Neohexaose, Monofucosyllacto-N-Hexaose I or II, Isomeric Fucosylated Lacto-N-Hexaose 1 or 3, Monofucsyllacto-N-Neoexaose, Difucosyl-Para-Lacto-N-Neohexaose, and Difucosyl-Para-Lacto-N-Hexaose, thereby promoting colonization of the infant's gastrointestinal tract with *Bifidobacterium infantis*. In some embodiments, the method further comprises the administration of lacto-N-neohexaose. In some embodiments, the method further comprises the co-administration of an inoculum of *Bifidobacterium infantis*.

If co-administration of an inoculum of *Bifidobacterium infantis* is used, the method can further comprise the administration of an effective amount of at least one oligosaccharide selected from the group consisting of lacto-N-neohexaose, isomeric fucosylated lacto-N-hexaose, and difucosyllacto-N-hexaose, Lacto-N-Fucopentaose I, II, III, or V, Lacto-N-Neohexaose, Lacto-N-Hexaose, Para-Lacto-N-Hexaose, Para-Lacto-N-Neohexaose, Monofucosyllacto-N-Hexaose I or II, Isomeric Fucosylated Lacto-N-Hexaose 1 or 3, Monofucsyllacto-N-Neoexaose, Difucosyl-Para-Lacto-N-Neohexaose, and Difucosyl-Para-Lacto-N-Hexaose, without the inoculum of *Bifidobacterium infantis*, after colonization of the infant's gastrointestinal tract with *Bifidobacterium infantis*.

In some embodiments, the method can utilize at least two, at least three, at least four, at least five, or at least six or more of the oligosaccharides.

Further, in some embodiments of the method, the oligosaccharides are in the form of a tablet, a capsule, a lozenge, a chewing gum, a food product, or a supplemented beverage. Examples of supplemented beverages include infant formula, follow-on formula, a toddler's beverage, milk, fruit juice, and fruit-based drinks. In these embodiments, the supplemented beverage contain oligosaccharides at a concentration of, for example, 100 micrograms/L to 25 grams/L.

In other embodiments of the method, the oligosaccharides are in a food product such as baby food, yogurt, or candy. In such food products, the oligosaccharides can be present at a concentration, for example, of 100 micrograms/L to 25 grams/L.

BRIEF DESCRIPTION OF THE DRAWINGS

FIGS. 1A-C illustrate FTICR-MS glycoprofiling of bacterial fermentations. FIG. 1A shows FTICR-MS output with HMO present upon inoculation with *B. longum* bv. *infantis* (T=0 hrs), full mass spectra. FIGS. 1B and 1C show difference in oligosaccharide peak height correspond to bacterial consumption between 0 and 94 hrs, zoom-in on selected peaks.

FIG. 2A shows individual HMO abundance represented as the normalized percent contribution of each isomeric oligosaccharide species in breast milk, as measured in Ninonuevo et al. (Ninonuevo et al., *Journal of Agricultural and Food Chemistry* (2006) 54, (20), 7471-7480). Boxed bars are the four most abundant oligosaccharides species in the total pool of HMO analyzed, representing 70% of the overall detectable HMO pool. *=fucosylated HMOs. Nano-electrospray ionization Fourier transform ion cyclotron resonance mass spectrometry (NanoESI-FT-ICR (+) MS) analysis of *B. longum* bv. *infantis* (FIG. 2B), *B. longum* bv. *longum* (FIG. 2C), *B. breve* (FIG. 2D), grown on a media initially supplemented with 2.0% (w/v) HMO. This is represented as a percent difference of HMO species abundance in the media and at the end of fermentation, corresponding to T=0 hrs and T=94 hrs for *B. longum* bv. *infantis*, 45 hrs for *B. longum* bv. *longum* and *B. breve*. Measurements are triplicates of individual biological and technical replicates. FIG. 2E shows growth curves of *B. longum* bv. *infantis* (▲), *B. longum* bv. *longum* (■), *B. breve* (●) on a semi-synthetic MRS medium supplemented with 2% (w/v) HMO. Growth was measured as optical density (OD) of the media at 600 nm. Fermentations were carried out in triplicate; controls consisted of inoculated medium lacking HMO and un-inoculated medium containing HMO which was also used as a blank for OD measurements. Error bars are standard deviations of the mean for each available time point.

DETAILED DESCRIPTION OF THE INVENTION

I. Introduction

Figure 1A:
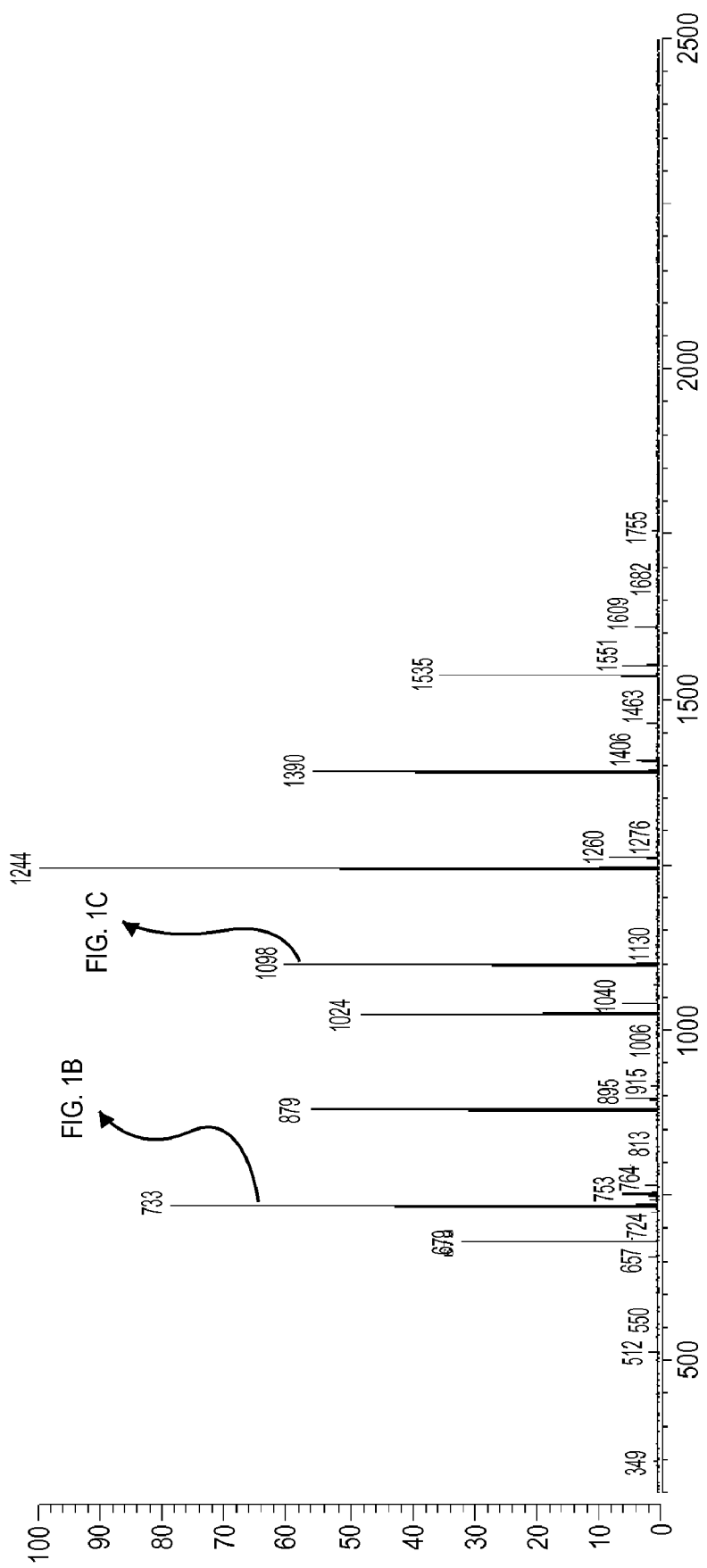

The constant selective pressure on milk as the sole source of nourishment for mammalian infants is a remarkable model for how diet affects all aspects of development and health. Breastfeeding is a balance between the infant's nutritional needs and a large metabolic effort by the mother to ensure offspring survival and maximize her reproductive potential. In a recent report, the World Health Organization (WHO) referred to breastfeeding as the "biological norm", and the breastfed infant as a "normative model for optimal growth and development" (Onis et al., *Acta Paediatrica* (2006) 95, 7-15), yet the bioactive, health-promoting components of human milk and their modes of action are little understood. An extraordinary aspect, exclusively noted in breastfeeding infants, is the selective nourishment and support of a protective, co-evolved gut microbiota (Backhed et al., *Science* (2005) 307, (5717), 1915-1920), dominated by bifidobacteria (Haarman et al., *Appl. Environ. Microbiol.* (2005) 71, (5), 2318-2324). Numerous studies have shown that certain bifidobacterial species, as *B. breve* and *B. longum* bv. *infantis* are generally predominately from infant feces, while *B. adolescentis* is typically only found in adult feces and other strains, such as, *B. bifidum*, *B. longum* and *B. bifidum* have been isolated from both environments (Ventura et al., *Fems Microbiology Ecology* (2001) 36, (2-3), 113-121).

Human milk/colostrum contains between 3-20 gr/L (Coppa et al., *Changes in Carbohydrate-Composition in Human-Milk over 4 Months of Lactation. Pediatrics* (1993) 91, (3), 637-641) of HMO composed of lactose reducing ends elongated with up to 25 N-acetyllactosamine units, which can be extensively fucosylated and/or sialylated at the non-reducing end termini through α-glycosidic linkages (Ninonuevo et al., *Journal of Agricultural and Food Chemistry* (2006) 54, (20), 7471-7480). Fucosylated HMO protect infants against diarrhea and are an important element of an innate immune system transferred through and developed by breast milk (Newburg et al., *Glycobiology* (2004) 14, (3), 253-263). Infants cannot digest HMOs which arrive intact in the large intestine; while having no apparent direct nutritional role, they modulate the establishment of a protective microbiota flora, enriched in *bifidobacteria* and exclusively characteristic of breast-fed infants (Chaturvedi et al., *Bioactive Components of Human Milk* (2001) 501, 315-323). Despite the importance of these bioactive components for infant health, and the significance of gastrointestinal tract microbiome composition on host health and its energy absorption (Turnbaugh et al., *Nature* (2006) 444, (7122), 1027-1031), a direct link between specific HMO species and *bifidobacteria* remained to be established (Bode, L., *J. Nutr.* (2006) 136, (8), 2127-2130). Recently, we profiled with high resolution over 200 different HMO structures differing in their size, charge, and sequence (Ninonuevo et al., *Journal of Agricultural and Food Chemistry* (2006) 54, (20), 7471-7480), and developed a deuterium labeling scheme to precisely quantify bacterial consumption of HMOs (Ninonuevo et al., *Analytical Biochemistry* (2007) 361, (1), 15-23). To understand the molecular basis underlying HMO metabolism by infant-gut related bacteria, we determined consumption glycoprofiles for selected *bifidobacteria*, and we report herein which individual milk oligosaccharide species are consumed by these microorganisms. This work has overcome the analytical complexity previously hindering the study of these oligosaccharide structures and has enabled an understanding of the relationship between specific HMOs and *bifidobacteria*. This discovery allows the development of prebiotic and probiotic compositions that may be used to establish and/or maintain a healthy gut flora, especially in individuals with an undeveloped or compromised gut flora such as in infants, the elderly, or those who have undergone antibiotic therapy, chemotherapy, or who suffer from various diseases.

II. Definitions

The term "human milk oligosaccharides (HMO)" refers generally to a number of complex carbohydrates found in human milk. Among the monomers of milk oligosaccharides are D-glucose (Glc), D-galactose (Gal), N-acetylglucosamine (GlcNAC), L-fucose (Fuc), and sialic acid [N-acetylneuraminic acid (NeuAc)]. Elongation may be achieved by attachment of GlcNAc residues linked in $\beta$1-3 or $\beta$1-4 linkage to a Gal residue followed by further addition of Gal in a $\beta$-1-3 or $\beta$-1-4 bond. Most HMOs carry lactose at their reducing end. From these monomers, a large number of core structures may be formed. Further variations may occur due to the attachment of lactosamine, Fuc, and/or NeuAc. See, e.g., Kunz, C. et al., *Annual. Rev. Nutri.* (2000) 20:699-722, for a further description of HMOs.

The term "Bifidobacteria" and its synonyms refer to a genus of anaerobic bacteria having beneficial properties for humans. Bifidobacteria is one of the major strains of bacteria that make up the gut flora, the bacteria that reside in the gastrointestinal tract and have health benefits for their hosts. See, e.g., Guarner F and Malagelada J R. *Lancet* (2003) 361, 512-519, for a further description of Bifidobacteria in the normal gut flora.

The term "isolated," when applied to a oligosaccharide, denotes that the oligosaccharide is essentially free of other milk components with which it is associated in the natural state, i.e., in human breast milk. It can be in, for example, a dry or aqueous solution.

The term "purified" denotes that an oligosaccharide has been separated at least in part from other components of human breast milk. Particular oligosaccharides can be purified individually or a combination of oligosaccharides can be purified away from at least one other component of milk. In some embodiments, the oligosaccharide can be at least 85% pure, optionally at least 95% pure, and optionally at least 99% pure.

A "prebiotic" or "prebiotic nutrient" is generally a non-digestible food ingredient that beneficially affects a host when ingested by selectively stimulating the growth and/or the activity of one or a limited number of bacteria in the gastrointestinal tract. As used herein, the term "prebiotic" refers to the above described non-digestible food ingredients in their non-naturally occurring states, e.g., after purification, chemical or enzymatic synthesis as opposed to, for instance, in whole human milk.

A "probiotic" is generally a non-pathogenic microorganism, frequently a bacterium, fed to humans or animals as a way to prevent colonization of the gastrointestinal tract by pathogenic bacteria. Probiotic bacterium are provided to colonize muscosal surfaces as a way of blocking colonization by pathogenic microorganisms. As an example, *Lactobacillus* is perhaps the most commonly studied probiotic in people. In the context of the present invention, various bifidobacterial strains can serve as probiotics that are useful in a variety of settings. For example, *Bifidobacterium infantis* is a probiotic useful for the prevention of colonization of the naïve infant gastrointestinal by pathogenic bacteria.

An oligosaccharide having a particular "charge/mass (m/z) ratio" refers to an oligosaccharide having the recited charge/mass ratio as measured by matrix-assisted laser desorption/ionization (MALDI). See, Ninonuevo et al., *Analytical Biochemistry* (2007) 361, (1), 15-23.

An oligosaccharide that "naturally occurs in human breast milk" refers to an oligosaccharide that can be detected in human breast milk, for example, detected by FTICR MS as described herein. Although an oligosaccharide naturally occurs in human breast milk, i.e., an oligosaccharide of the same structure can be detected in human breast milk, an oligosaccharide can be produced synthetically and nevertheless be detected in human breast milk.

A "synthetic" composition refers to a non-naturally-occurring composition. For example, the composition can include ingredients that are purified or isolated or are otherwise artificially (not naturally) synthesized.

III. Oligosaccharides of the Invention

The left column of the following table summarizes the oligosaccharides identified by mass/charge ratio (m/z) that occur in human milk and that are metabolized at least to some extent by *B. infantis*. The right column of the table lists specific oligosaccharides which correspond to the mass/charge ratios provide in the left column. As detailed further herein, the present invention provides for prebiotic formulations comprising any 1, or combinations of 2,3, 4, 5, 6, 7, 8, 9, 10, or more of the oligosaccharides of the left or right column of the table.

TABLE 1

| m/z | Oligosaccharide |
|---|---|
| 732.3 | Lacto-N-Tetraose |
| | Lacto-N-Neotetraose |
| 878.3 | Lacto-N-Fucopentaose I |
| | Lacto-N-Fucopentaose II |
| | Lacto-N-Fucopentaose III |
| | Lacto-N-Fucopentaose V |
| 1097.4 | Lacto-N-Hexaose |
| | Para-Lacto-N-Hexaose |
| | Lacto-N-Neohexaose |
| | Para-Lacto-N-Neohexaose |
| 1243.4 | Monofucosyllacto-N-Hexaose II |
| | Isomeric Fucosylated Lacto-N-Hexaose (1) |
| | Monofucosyllacto-N-Hexaose |
| | Isomeric Fucosylated Lacto-N-Hexaose (3) |
| | Isomeric Fucosylated Lacto-N-Hexaose (2) |
| 1389.5 | Difucosyl-Para-Lacto-N-Neohexaose |
| | Difucosyl-Para-Lacto-N-Hexaose |
| | Difucosyllacto-N-Hexaose |
| 1462.5 | Lacto-N-Neoocataose |
| | Para-Lacto-N-Octanose |
| | Iso-Lacto-N-Octaose |
| | Lacto-N-Octaose |

TABLE 1-continued

| m/z | Oligosaccharide |
|---|---|
| 1608.6 | Monofucosyllacto-Nneoocataose |
|  | Monofucosyllacto-N-Ocataose |
| 1754.6 | Difucosyllacto-N-Octaose I |
|  | Difucosyllacto-N-Octaose II |
|  | Difucosyllacto-N-Neoocataose II |
|  | Difucosyllacto-N-Neoocataose I |
| 1827.6 | Lacto-N-Decaose |
| 1900.7 | Trifucosyllacto-N-Neooctaose |
|  | Trifucosyllacto-N-Octaose |
|  | Trifucosyl-Iso-Lacto-N-Octaose |

The above-described oligosaccharides are depicted in FIGS. 6-15.

In one aspect, the present invention provides a prebiotic composition comprising at least one HMO selected from Table 1. In another aspect, the present invention provides a prebiotic composition comprising at least two or more (e.g., 3, 4, 5, 6, 7, 8, 9, or more) oligosaccharides from Table 1.

As explained in the Examples, oligosaccharides corresponding to m/z ratios of about 732.3, 1243.4, 1389.5 and 1097.4 represent a majority, by quantity, of oligosaccharides in human milk. Therefore, in some embodiments, the prebiotic composition comprises 1, 2, 3, or all 4 of the above-listed oligosaccharides, optionally with an inoculum of $B.$ $infantis$. In some embodiments, oligosaccharides having an m/z ratio of about 732.3, 1243.4, and 1389.5, optionally further including an oligosaccharide having an m/z ratio of 1097.4 and/or an oligosaccharide having an m/z ratio of about 878.3 (and/or an other oligosaccharide from Table 1) are included in the prebiotic composition.

In various embodiments of the above aspects, the prebiotic and probiotic compositions of the invention are used as supplements that can be consumed directly in the form of pills, tablets, or capsules. Alternatively, the compositions may be used to supplement foods or beverages that may be consumed to promote the development and maintenance of a healthy gut flora.

In further aspects, the present invention provides a method of promoting the growth of $Bifidobacterium$ $infantis$ in an infant's gastrointestinal tract by the administration of an effective amount of at least one oligosaccharide in a prebiotic composition (e.g., not human breast milk) selected from Table 1, thus promoting colonization of the infant's gastrointestinal tract with $Bifidobacterium$ $infantis$. In some embodiments of this aspect, the administration of oligosaccharides is provided with an inoculum of $Bifidobacterium$ $infantis$.

A. Human Milk Oligosaccharides (HMO) of the Invention

As described in greater detail in the Examples, FTICR-MS glycomic profiling has now been used to identify a series of small mass HMOs that are selectively consumed by $B.$ $infantis$. The chemical structures of these HMOs are shown in FIGS. 3 and 6-15. Among the features of many of these oligosaccharides is a degree of polymerization (DP)≦7. However, some HMOs with a DP≧10 were also consumed by $B.$ $infantis$. As shown in FIGS. 3 and 6-15, most of the oligosaccharides consumed by $B.$ $infantis$ were fucosylated.

The HMOs of the present invention can be derived using any of a number of sources and methods known to those of skill in the art. For example, HMOs can be purified from human milk using methods known in the art. One such method for extraction of oligosaccharides from pooled mother's milk entails the centrifugation of milk at 5,000×g for 30 minutes at 4° C. and fat removal. Ethanol is then added to precipitate proteins. After centrifugation to sediment precipitated protein, the resulting solvent is collected and dried by rotary evaporation. The resulting material is adjusted to the appropriate pH of 6.8 with phosphate buffer and β-galactosidase is added. After incubation, the solution is extracted with chloroform-methanol, and the aqueous layer was collected. Monosaccharides and disaccharides are removed by selective adsorption of HMOs using solid phase extraction with graphitized nonporous carbon cartridges. The retained oligosaccharides can be eluted with water-acetonitrile (60:40) with 0.01% trifluoroacetic acid. (See, e.g., Ward et al., Appl. Environ. Microbiol. (2006), 72: 4497-4499; Gnoth et al., J. Biol. Chem. (2001), 276:34363-34370; Redmond and Packer, Carbohydr. Res., (1999), 319:74-79.) Individual HMOs can be further separated using methods known in the art such as capillary electrophoresis, HPLC (e.g., high-performance anion-exchange chromatography with pulsed amperometric detection; HPAEC-PAD), and thin layer chromatography. See, e.g., Splechtna et al., $J.$ $Agricultural$ $and$ $Food$ $Chemistry$ (2006), 54: 4999-5006.

Alternatively, enzymatic methods can be used to synthesize the HMOs of the present invention. In general, any oligosaccharide biosynthetic enzyme or catabolic enzyme (with the reaction running in reverse) that converts a substrate into any of the HMO structures (or their intermediates) may be used in the practice of this invention. For example, prebiotic galacto-oligosaccharides have been synthesized from lactose using the β-galactosidase from $L.$ $reuteri$ (see, Splechtna et al., $J.$ $Agricultural$ $and$ $Food$ $Chemistry$ (2006), 54: 4999-5006). The reaction employed is known as transgalactosylation, whereby the enzyme β-galactosidase hydrolyzes lactose, and, instead of transferring the galactose unit to the hydroxyl group of water, the enzyme transfers galactose to another carbohydrate to result in oligosaccharides with a higher degree of polymerization (Vandamme and Soetaert, $FEMS$ $Microbiol.$ $Rev.$ (1995), 16:163-186). The transgalactosylation reaction can proceed intermolecularly or intramolecularly. Intramolecular or direct galactosyl transfer to D-glucose yields regioisomers of lactose. Through intermolecular transgalactosylation di-, tri-, and tetra saccharides and eventually higher oligosaccharides specific to Bifidobacteria are produced. A related method utilizes the β-galactosidase of $Bifidobacterium$ $bifidum$ NCIMB 41171 to synthesize prebiotic galacto-oligosaccharides (see, Tzortzis et al., Appl. Micro. and Biotech. (2005), 68:412-416).

Another approach to the synthesis of the carbohydrates of the invention that combines elements of the methods outlined above entails the chemical or enzymatic synthesis of or isolation of oligosaccharide backbones containing Lacto-N-biose, or Lacto-N-tretrose from non-human mammalian milk sources (e.g., cows, sheep, buffalo, goat, etc.) and enzymatically adding Lacto-N-biose, Fucose and Sialic Acid units as necessary to arrive at the HMO structures of the present invention. For this purpose, a variety of bifidobacterial carbohydrate modifying enzymes, such as those disclosed in PCT Publication WO 2008/033520 can be utilized. Examples of such oligosaccharide modifying enzymes include sialidases, silate O-Acetylesterases, N-Acetylneuraminate lyases, N-acetyl-beta-hexosaminidase, beta-galactosidases, N-acetylmannosamine-6-phosphate 2-epimerases, alpha-L-fucosidases, and fucose dissimilation pathway proteins, among others, which may be used to catalyze a biosynthetic reaction under the appropriate conditions.

Alternatively, conventional chemical methods may be used for the de novo organic synthesis of or conversion of pre-existing oligosaccharides into the HMO structures of the present invention. See, e.g., March's Advanced Organic Chemistry: Reactions, Mechanisms, and Structure, 5th Edition.

B. Prebiotic and Probiotic Formulations

In general, any food or beverage that can be consumed by human infants or adults or animals may be used to make formulations containing the prebiotic and probiotic compositions of the present invention. Preferable foods include those with a semi-liquid consistency to allow easy and uniform dispersal of the prebiotic and probiotic compositions of the invention. Accordingly, such food items include, without limitation, dairy-based products such as cheese, cottage cheese, yogurt, and ice cream. Fruits and vegetables targeted for infants/toddlers, such as apple sauce or strained peas and carrots (Gerber Products Company; Fremont, Mich.) are also suitable for use in the present invention. Both infant cereals such as rice- or oat-based cereals (Gerber) and adult cereals such as Musilix may also be suitable for use in this invention. In addition to foods targeted for human consumption, animal feeds may also be supplemented with the prebiotic and probiotic compositions of the invention.

Alternatively, the prebiotic and probiotic compositions of the invention may be used to supplement a beverage. Examples of such beverages include, without limitation, infant formula, follow-on formula, toddler's beverage, milk, fermented milk, fruit juice, fruit-based drinks, and sports drinks. Many infant and toddler formulas are known in the art and are commercially available, including, for example, Carnation Good Start (Nestle Nutrition Division; Glendale, Calif.) and Nutrish A/B produced by Mayfield Dairy Farms (Athens, Tenn.). Other examples of infant or baby formula include those disclosed in U.S. Pat. No. 5,902,617. Other beneficial formulations of the compositions of the present invention include the supplementation of animal milks, such as cow's milk, which are normally lacking in HMOs.

Alternatively, the prebiotic and probiotic compositions of the present invention may be formulated into pills or tablets or encapsulated in capsules, such as gelatin capsules. Tablet forms can include one or more of lactose, sucrose, mannitol, sorbitol, calcium phosphates, corn starch, potato starch, microcrystalline cellulose, gelatin, colloidal silicon dioxide, talc, magnesium stearate, stearic acid, and other excipients, colorants, fillers, binders, diluents, buffering agents, moistening agents, preservatives, flavoring agents, dyes, disintegrating agents, and pharmaceutically compatible carriers. Lozenge or candy forms can comprise the compositions in a flavor, e.g., sucrose, as well as pastilles comprising the compositions in an inert base, such as gelatin and glycerin or sucrose and acacia emulsions, gels, and the like containing, in addition to the active ingredient, carriers known in the art. The inventive prebiotic or probiotic formulations may also contain conventional food supplement fillers and extenders such as, for example, rice flour.

In some embodiments, the prebiotic or probiotic composition will further comprise a non-human protein, non-human lipid, non-human carbohydrate, or other non-human component. For example, in some embodiments, the compositions of the invention comprise a bovine (or other non-human) milk protein, a soy protein, betalactoglobulin, whey, soybean oil or starch.

The dosages of the prebiotic and probiotic compositions of the present invention will be varied depending upon the requirements of the individual and will take into account factors such as age (infant versus adult), weight, and reasons for loss of beneficial gut bacteria (e.g., antibiotic therapy, chemotherapy, disease, or age). The amount administered to an individual, in the context of the present invention should be sufficient to establish colonization of the gut with beneficial bacteria over time. The size of the dose also will be determined by the existence, nature, and extent of any adverse side-effects that may accompany the administration of a prebiotic or probiotic composition of the present invention. The dosage range, effective as a food supplement and for reestablishing beneficial bacteria in the intestinal tract, ranges from about 1 micrograms/L to about 25 grams/L. A further advantageous range is about 100 micrograms/L to about 15 grams/L. Another useful range is 1 gram/L to 10 grams/L. In one embodiment, a concentration of 8 grams/L is preferred. (See, e.g., Knol et al., *J. Pediatric Gastro. and Nutr.* (2005) 40:36-42.) When used, Bifidobacteria may be included in the formulations of the invention in an amount of $10^6$ to $10^{12}$ colony forming units (CFU). A further advantageous range is $10^8$ to $10^{12}$ CFU. In one advantageous embodiment, $10^{10}$ CFU of Bifidobacteria may be included in the formulations of the invention.

It will be appreciated that it may be advantageous for some applications to include other Bifidogenic factors in the formulations of the present invention. Such additional components may include, but are not limited to, fructoligosaccharides such as Raftilose (Rhone-Poulenc, Cranbury, N.J.), inulin (Imperial Holly Corp., Sugar Land, Tex.), and Nutraflora (Golden Technologies, Westminister, Colo.), as well as xylooligosaccharides, galactooligosaccharides, soyoligosaccharides, lactulose/lactitol, among others. In some applications, other beneficial bacteria, such as *Lactobacillus*, may be included in the formulations.

The present invention includes methods of making any of the above-described compositions. For example, the invention provides for methods of combining at least one or more oligosaccharide of Table 1 with a non-human protein, non-human lipid, non-human carbohydrate, or other non-human component to produce a synthetic prebiotic or probiotic food. For example, in some embodiments, 1, 2, 3, or all 4 oligosaccharides having an m/z ratio of about 732.3, 1243.4, and 1389.5 (and optionally about 1097.4 and/or 878.3 or an other oligosaccharide from Table 1) are combined with a non-human protein, non-human lipid, non-human carbohydrate, or other non-human component. In some embodiments, at least one or more oligosaccharide of the present invention are combined with a bovine (or other non-human) milk protein, a soy protein, betalactoglobulin, whey, soybean oil or starch.

EXAMPLES

The following examples are offered to illustrate, but not to limit the claimed invention. Those of skill in the art will readily recognize a variety of noncritical parameters that could be changed or modified to yield essentially similar results.

Example 1

Methods and Materials

A. Human Milk Oligosaccharides (HMO) Purification

HMO were separated from pooled human breast milk samples as described in Ward et al (Ward et al., *Appl. Environ. Microbiol.* (2006) 72, (6), 4497-4499). Pooled milk was provided by the Mother's Milk Bank of San Jose, Calif., USA and the Mother's Milk Bank of Austin, Tex., USA.

B. Bacterial Growths

*Bifidobacterium longum* bv. *infantis* ATCC 15697 and *B. breve* ATCC 15700 were obtained from the American Type Culture Collection (Manassas, Va.), *B. longum* bv. *longum* DJO10A was from D. O'Sullivan, University of Minnesota. Cultures were initially propagated in deMan, Rogosa, Sharpe broth (Becton Dickinson, Sparks, Md.) then grown twice on a semi-synthetic MRS medium, devoid of a carbohydrate source (Barrangou et al., *Proceedings of the National Academy of Sciences of the United States of America* (2003) 100, (15), 8957-8962). This medium was supplemented with 2.0% (w/v) sterile filtered (Millex-GV, 0.22 µm, Millipore, Billerica, Mass.) HMO as the only carbohydrate source. There was no detectable growth on this medium ($OD_{600nm}$<0.2) without the addition of a carbohydrate source. All media were supplemented with 1% (w/v) L-cysteine and all incubations were carried out at 37° C. in an anaerobic chamber (Coy Laboratory Products, Grass Lake, Mich.). Cell growth was measured by assessing optical density at 600 nm with a ND-1000 Spectrophotometer (NanoDrop Technologies, Wilmington, Del.). Samples were grown in triplicate and controls consisted of inoculated medium lacking HMO and un-inoculated medium containing HMO. Error bars are represented as standard deviation of the means. Samples were collected at 0, 28, 94 and 148 hours for *Bifidobacterium longum* bv. *infantis*, 0 and 45 hours for and *B. breve* and *B. longum* bv. *longum*, and stored at −80° C. When *B. longum* bv. *infantis* was grown at 0.8% (w/v) HMO samples were collected at 0, 25 and 50 hrs. Prior to oligosaccharide isolation and purification (See Materials and Methods) all samples were boiled in a water bath for 5 minutes, centrifuged at 13,500 for 20 minutes, the resulting supernatant was collected, filtered with a 0.22 µm sterile Millex-GV (Millipore, Mass.) and stored at −20° C., until further use.

C. Oligosaccharide Isolation and Purification

Oligosaccharides recovered from supernatant (100 µL) were reduced using 100 µL of 2.0 M sodium borohydride and incubated at 42° C. for 1.6 hours. Thirty µL of deuterated milk oligosaccharides were reduced using sodium borodeuteride (0.1 g in 2.0 mL solution) and added as internal standards. The oligosaccharides were desalted and purified by solid phase extraction using 4 mL cartridge volume of 150 mg of bed weight of non-porous graphitized carbon black-solid phase extraction (Alltech, Deerfield, Ill.). Prior to use, the cartridge was washed with three volumes of 80% acetonitrile in 0.10% aqueous trifluoroacetic acid (TFA) (v/v) and another three volumes of deionized water. The oligosaccharides were loaded onto the cartridge and subsequently washed with seven volumes of deionized water, eluted with two volumes of 20% acetonitrile in water (v/v), dried in vacuo, reconstituted with 50 µL deionized water and diluted 2000 times with 50% acetonitrile in 0.1% formic acid (v/v) prior to MS analysis.

D. MS Analysis

All mass spectra were acquired on a HiResESI QFT-hybrid Fourier transform ion cyclotron resonance mass spectrometer with a 9.4 Tesla shielded superconducting magnet (IonSpec Corp., Irvine, Calif.). Samples were introduced using a Micromass Z-spray source interfaced to a nano-ESI external ion source (New Objective, Woburn, Mass.). The mobile phase of 1:1 water:acetonitrile was delivered at a flow rate of 250 nL/min using a binary nanoLC pump (Eksigent Technologies, Livermore, Calif.). Ion excitation was performed by arbitrary waveform with amplitude of 125.0 V (base-to-peak) and detected by direct broadband mode at a rate of 1 MHz and 512K data points. Each spectrum was recorded with one acquisition scan in the positive ion mode.

E. Calculation of the Ratio of Deuterated and Undeuterated Species (D/H)

The D/H ratios were calculated using Formula 1 adapted from Xie et al. (Xie et al., *Analytical Chemistry* (2004) 76, (17), 5186-5197). The expected intensities for each signal were determined using the Ionspec exact mass calculator.

$$D/H=(n-mq/p)/m \quad \text{Formula 1}$$

where: m=A; n=A+1; p=A; q=A+1
m, n=relative intensities; p, q=expected intensities.

F. HMO Profiles through Lactation

Human milk samples were donated by four healthy women (M1-3, M5) of Reno, Nev. and were collected from the first day of lactation and were obtained daily for the first week; samples were obtained every other day for up to 10 weeks of lactation thereafter, depending on the ability of each mother to produce milk. All milk samples were stored at −80° C. prior to extraction.

Oligosaccharides were extracted, reduced and purified according to the recent published procedure (Ninonuevo et al., *Journal of Agricultural and Food Chemistry* (2006) 54, (20), 7471-7480). Briefly, each milk sample (0.5 mL) was centrifuged at 3500 rpm at 4° C. for 30 mins and was extracted with 10 mL (2:1) of a chloroform-methanol solution (v/v) and 2 mL deionized water. The emulsion was centrifuged at 3500 rpm at 4° C. for 30 mins and the lower chloroform layer was discarded. The upper layer was collected; the proteins were precipitated with 7 mL cold ethanol at 4° C. for 16 hours. The solution was centrifuged at 4° C. for 30 mins, the supernatant was recovered, dried and used for oligosaccharide analysis. Each oligosaccharide rich fraction was re-dissolved in 500 µL of deionized water and was reduced using 500 µL of 2.0 M sodium borohydride in deionized water and incubated at 42° C. for 16 hours. The oligosaccharides solution were desalted and purified using the above-mentioned procedure. The dried oligosaccharide rich fraction was re-constituted with 50 µL deionized water and was diluted 500 times with 50% acetonitrile:water in 0.1% formic acid prior to HPLC-Chip TOF MS analysis.

G. HPLC-Chip/TOF MS Analysis

Oligosaccharides were analyzed using an Agilent 1200 Series HPLC-Chip system (Santa Clara, Calif.) equipped with a chip consisting of 40 nL enrichment column and 43×0.75 mm ID analytical column, both packed with porous graphitized carbon 5 µm stationary phase. A nanoliter pump gradient was delivered at 0.3 µL/min consisting of A) 3.0% acetonitrile:water in 0.1% formic acid and B) 90% acetonitrile:water in 0.1% formic acid. A 45 minute LC gradient was run from 0-16% B, 2.5-20.0 mins, 16-44% B, 20.0-30.0 mins, 44-100% B, 30.0-35.0 mins with equilibration time of 20 mins at 0% B. Data was acquired in the positive ionization mode with a mass range of m/z 500-3000. Data analysis was performed using Analyst QS 1.1 software and the deconvoluted lists of masses were generated using Mass Hunter (Molecular Feature Extraction) software. Oligosaccharides were identified using a Glycan Finder program (in-house) written in Igor Pro version 5.04B software (WaveMetrics, Portland, Oreg.).

H. Glycosyl Hydrolase Assays

Assayed cells were incubated anaerobically at 37° C. on semi-synthetic MRS medium (Barrangou et al., *Proceedings of the National Academy of Sciences of the United States of America* (2003) 100: 8957-8962), with 1% (w/v) sterile filtered lactose or HMO as the sole carbon source. Early stationary phase cells were harvested and 200 mg of 0.1 mm diameter glass beads (BioSpec Products, Bartlesville, Okla.) were added to the suspensions which were subjected to two cycles of 45 s at power 6.0 m $s^{-1}$ on a FastPrep FP120 cell disruptor (Qbiogene, Morgan Irvine, Calif.). The beads and cell debris were removed by centrifugation. Cell-free extracts were collected and kept temporarily on ice until the start of the enzyme assays. Protein concentrations were determined according to the Bradford method using bovine serum albumin as the standard (Bradford, M. M., *Analytical Biochemistry* (1976) 72, (1-2), 248-254). Activity of α-L-fucosidase (EC 3.2.1.51) and sialidase (EC 3.2.1.18) were assayed with the fluorogenic substrates, 4-methylumbelliferyl α-L-fucopyranoside and 2'-(4-methylumbelliferyl) α-D-N-acetylneuraminic acid respectively. Fucosidase activity was assayed with a fluorogenic substrate concentration of 1 mM in 0.2 M phosphate-citrate buffer (pH 5.2), while the sialidase assay employed 0.5 mM of substrate mixed in equal volume with 50 µl 0.25 M sodium acetate-acetic acid buffer (pH 4.3). The reaction mixture containing 100 µl of cell-free extract and 100 µL substrate solution were incubated for 1 hr at 37° C. with the reaction stopped with 1.3 mL of 0.17 M glycine-carbonate buffer, pH 9.8. The fluorescence of enzymatically liberated 4-methylumbelliferone was determined in a Bio-Rad VersaFluor fluorometer (Eureka, Calif.) by excitation at 360 nm and emission measured at 460 nm. Serially diluted 4-methylumbelliferone was used to calibrate relative fluorescence units with substrate concentration. The specific activity of the glycosyl hydrolase was expressed as nanomoles of hydrolyzed substrate per milligram of protein per hour. Assays were performed in duplicates and the standard error was reported.

Example 2

Glycoprofiling of *Bifiobacteria* using MS

Figure 2A:
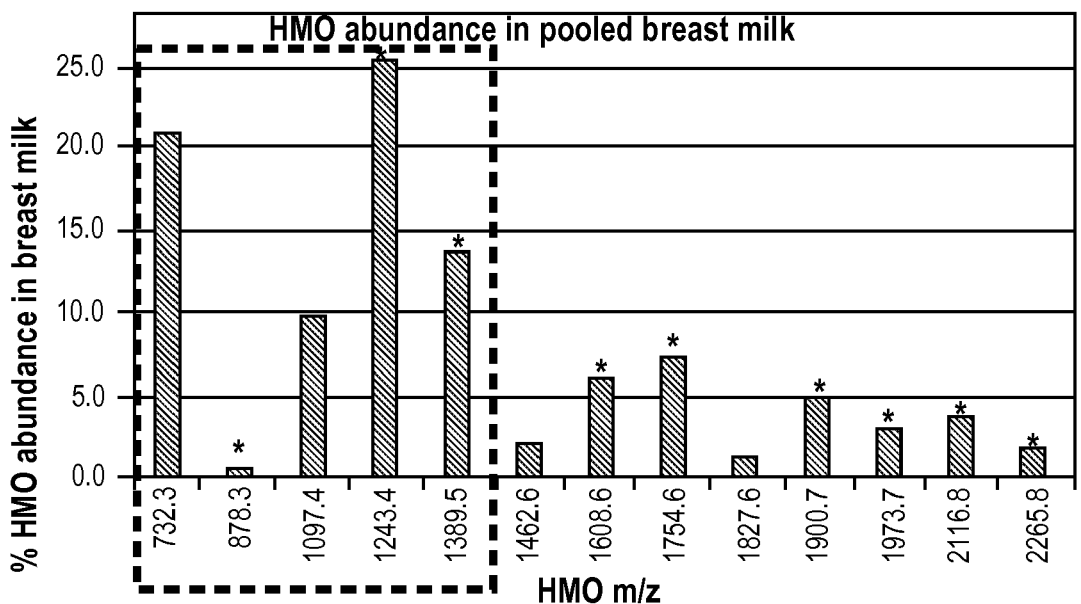
FIGS. 2A-E illustrate HMO consumption glycoprofiling for *B. longum* bv. *infantis* ATCC 15697, *B. longum* bv. *longum* DJO10A, *B. breve* ATCC15700.
Figure 2B:
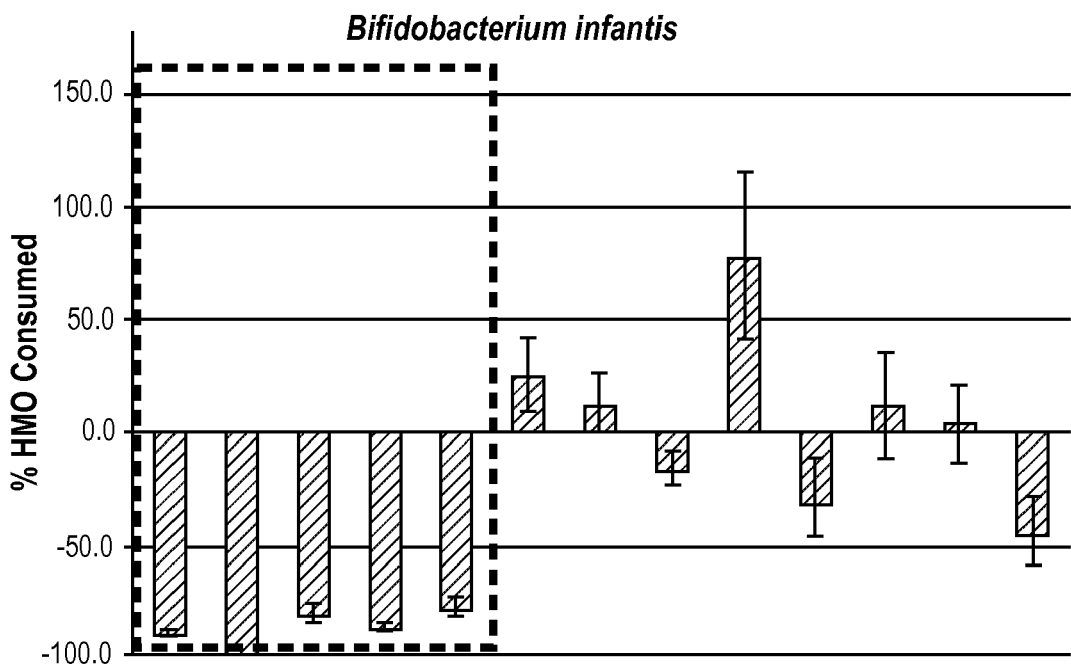
Figure 2C:
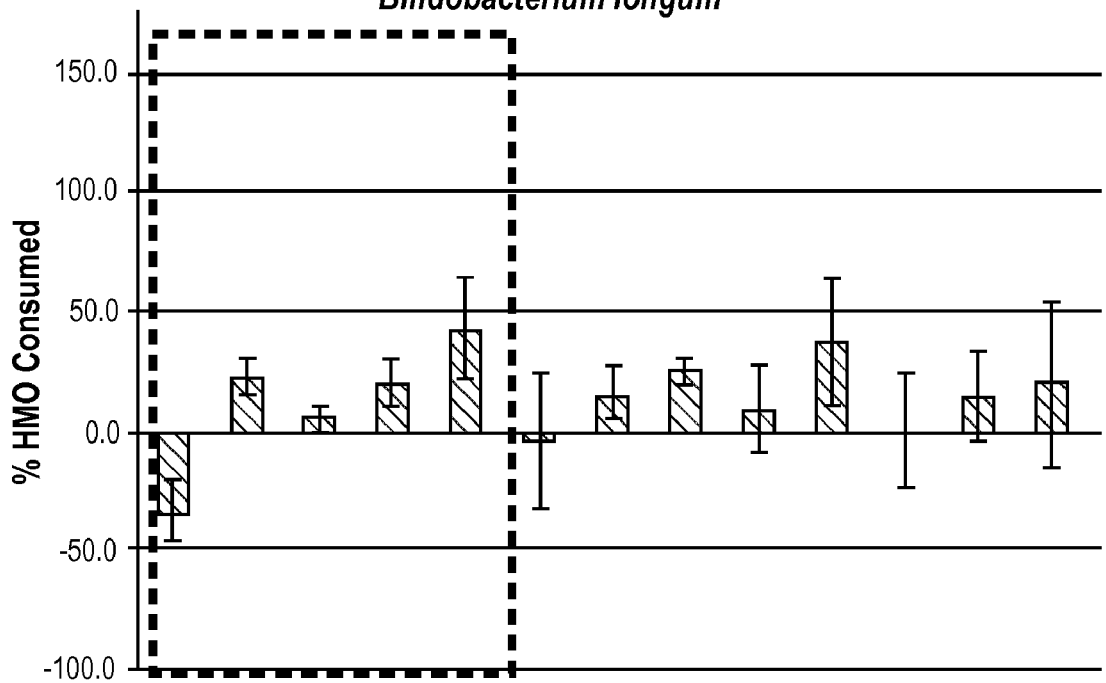
Figure 2D:
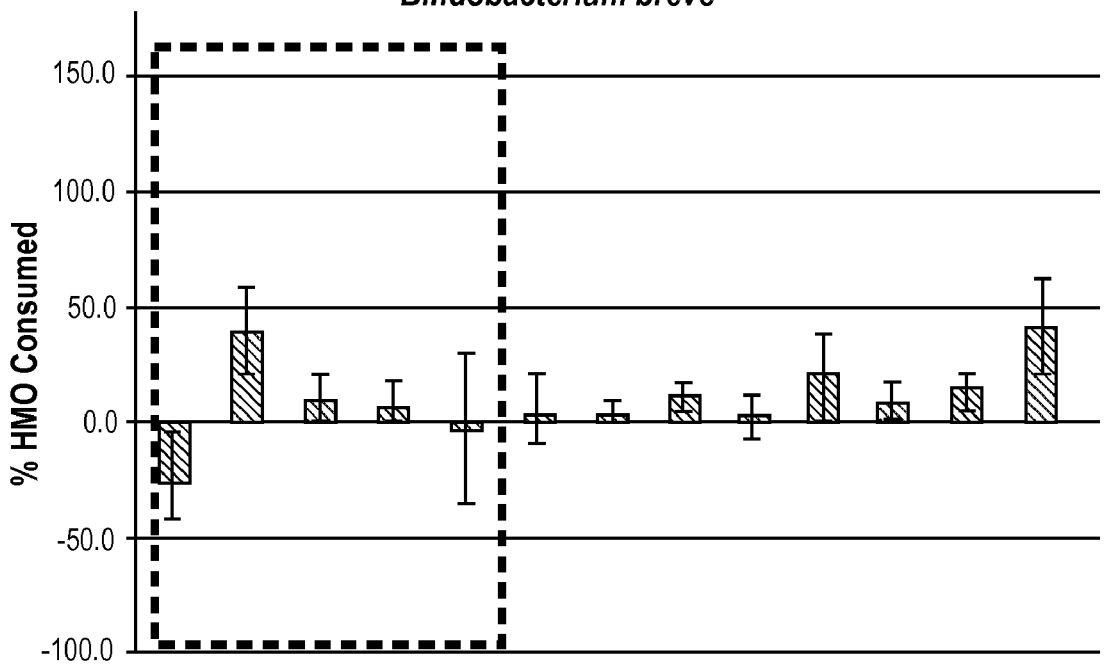

The development of analytical methods employing a high mass accuracy and high resolution Fourier transform ion cyclotron resonance mass spectrometry (FTICR MS) in combination with deuterium-labeled HMO as internal standards have enabled the detailed structural analysis of HMOs Ninonuevo et al., (*Analytical Biochemistry* (2007) 361, (1), 15-23). We have applied this MS-based technique to monitor the changes in absolute quantities of individual neutral and fucosylated oligosaccharide species (see Table 2). The mass to charge ratio (m/z) correlates to chain lengths and types of sugars present; the intensity of a particular mass indicates the extent of specific HMO consumption by the bacteria (FIG. 1). *B. longum* bv. *longum*, *B. longum* bv. *infantis*, and *B. breve*, representative of bifidobacterial species isolated from the gut in infant and adults, were profiled for their selectivity in fucosylated and neutral HMO consumption. Glycoprofiling of *B. longum* bv. *infantis*, a predominant bifidobacterial species in the breast-fed infant colon (Haarman et al., *Appl. Environ. Microbiol*. (2005) 71, (5), 2318-2324), revealed that oligosaccharides preferably consumed by the bacteria have a degree of polymerization (DP)≦7 (m/z 1389 and below), and represent the most abundant species of HMO in pooled human milk—indicating a selective correspondence between what the mother secretes in milk and what this strain consumes (FIG. 2*a-d* & FIG. 3). Additionally, some HMO with a DP≧10 were partially consumed, in particular oligosaccharide species with m/z 1754.6(−16.2%), 1900.7(−30.8%), and 2265.8 (−46.2%). Overall *B. longum* bv. *infantis* consumed 63.9% of the total HMO pool, and were mostly fucosylated (FIG. 2*b*). Conversely, the other strains tested, *B. longum* bv. *longum* DJO10A and *B. breve* ATCC 15700 only consumed, 35.2% and 24.4% of a single, non-fucosylated/non-sialylated HMO species, lacto-N-tetraose (LNT) (FIG. 2*c/d*) (m/z=732.3). While LNT is the second most abundant HMO in breast milk, its metabolism by *B. longum* bv. *longum* and *B. breve* represents respectively, only a 7.3% and 5.1% consumption of the overall detectable HMO pool.

TABLE 2

| # | Intensity | [M + Na]⁺ | % contribution | Hex | HexNAc | Fuc |
|---|-----------|-----------|----------------|-----|--------|-----|
| 1 | 2127.79 | 732.3 | 20.9 | 3 | 1 | |
| 2 | 72.15 | 878.3 | 0.7 | 3 | 1 | 1 |
| 3 | 997.23 | 1097.4 | 9.8 | 4 | 2 | |
| 4 | 2562.66 | 1243.4 | 25.2 | 4 | 2 | 1 |
| 5 | 1378.41 | 1389.5 | 13.5 | 4 | 2 | 2 |
| 6 | 202.62 | 1462.5 | 2.0 | 5 | 3 | |
| 7 | 603.75 | 1608.6 | 5.9 | 5 | 3 | 1 |
| 8 | 735.45 | 1754.6 | 7.2 | 5 | 3 | 2 |
| 9 | 141.09 | 1827.6 | 1.4 | 6 | 4 | |
| 10 | 505.39 | 1900.7 | 5.0 | 5 | 3 | 3 |
| 11 | 296.27 | 1973.7§ | 2.9 | 6 | 4 | 1 |
| 12 | 369.28 | 2119.8§ | 3.6 | 6 | 4 | 2 |
| 13 | 181.02 | 2265.8§ | 1.8 | 6 | 4 | 3 |

§= structural information not available for these oligosaccharides

List of HMO detected in pooled breast milk. For each HMO species, the intensity, mass to charge ratio as [M + Na]⁺, individual % contribution in breast milk, and monosaccharide composition are listed.
Hex = hexose;
HexNAc = N-acetylhexosamine;
Fuc = Fucose.
The sialylated oligosaccharides were less abundant and were not monitored in the positive mass spectrometry mode. They make up between 5-20% of the total milk oligosaccharide abundances and are better probed in the negative mode.

Example 3

HMO Preferences of *B. longum* bv. *infantis*

Figure 4A:
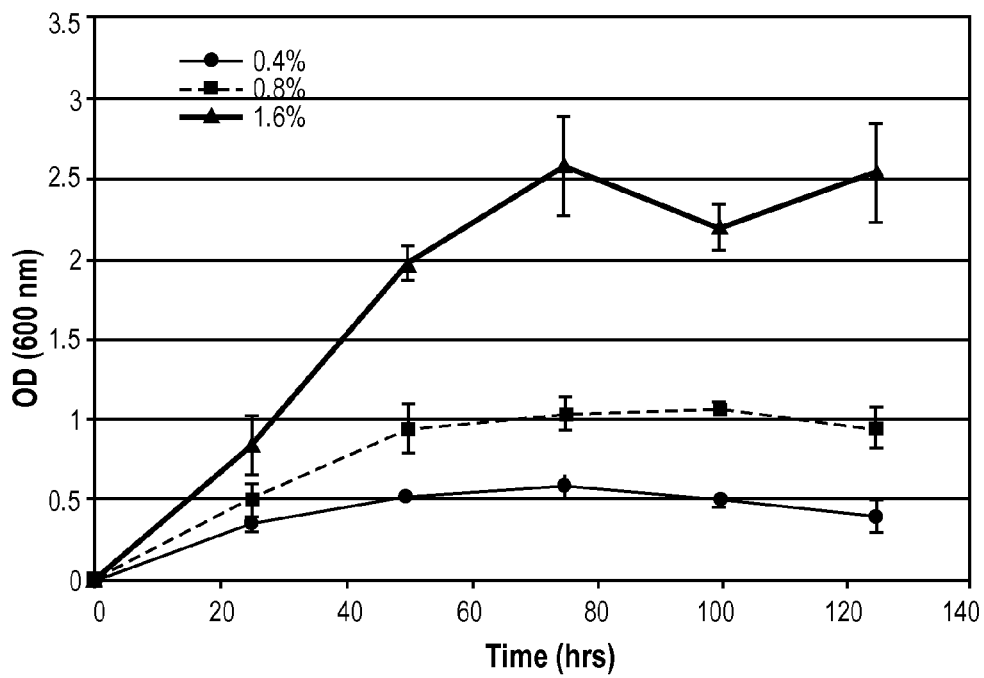
FIG. 4 illustrates HMO consumption glycoprofiling for *B. longum* bv. *infantis* ATCC 15697 under substrate limiting conditions. (a) Growth curves of *B. longum* bv. *infantis* on a semi-synthetic MRS medium supplemented with 1.6 (▲), 0.8 (■) and 0.4 (●) (w/v) HMO. Growth was measured as optical density (OD) of the media at 600 nm. Fermentations were carried out in triplicate; controls consisted of inoculated medium lacking HMO and un-inoculated medium containing HMO which was also used as a blank for OD measurements. Error bars are standard deviations of the mean for each available time point (b) NanoESI-FT-ICR (+) MS analysis of *B. longum* bv. *infantis* grown on a media initially supplemented with 0.8% (w/v) HMO.
Figure 4B:
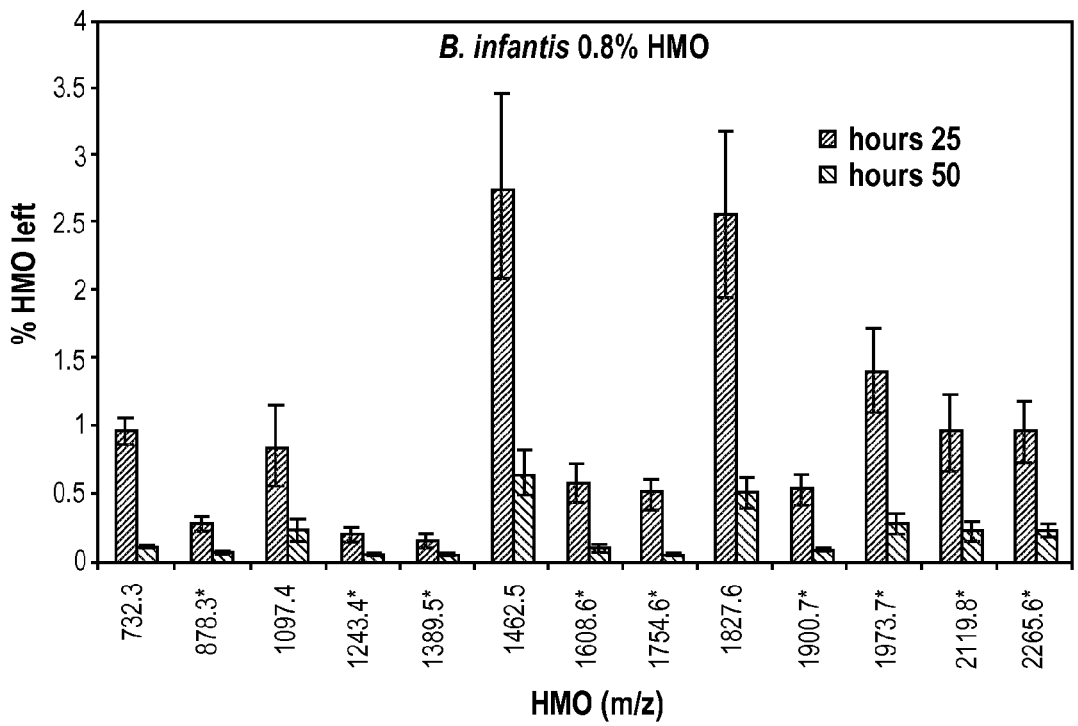
Figure 5:
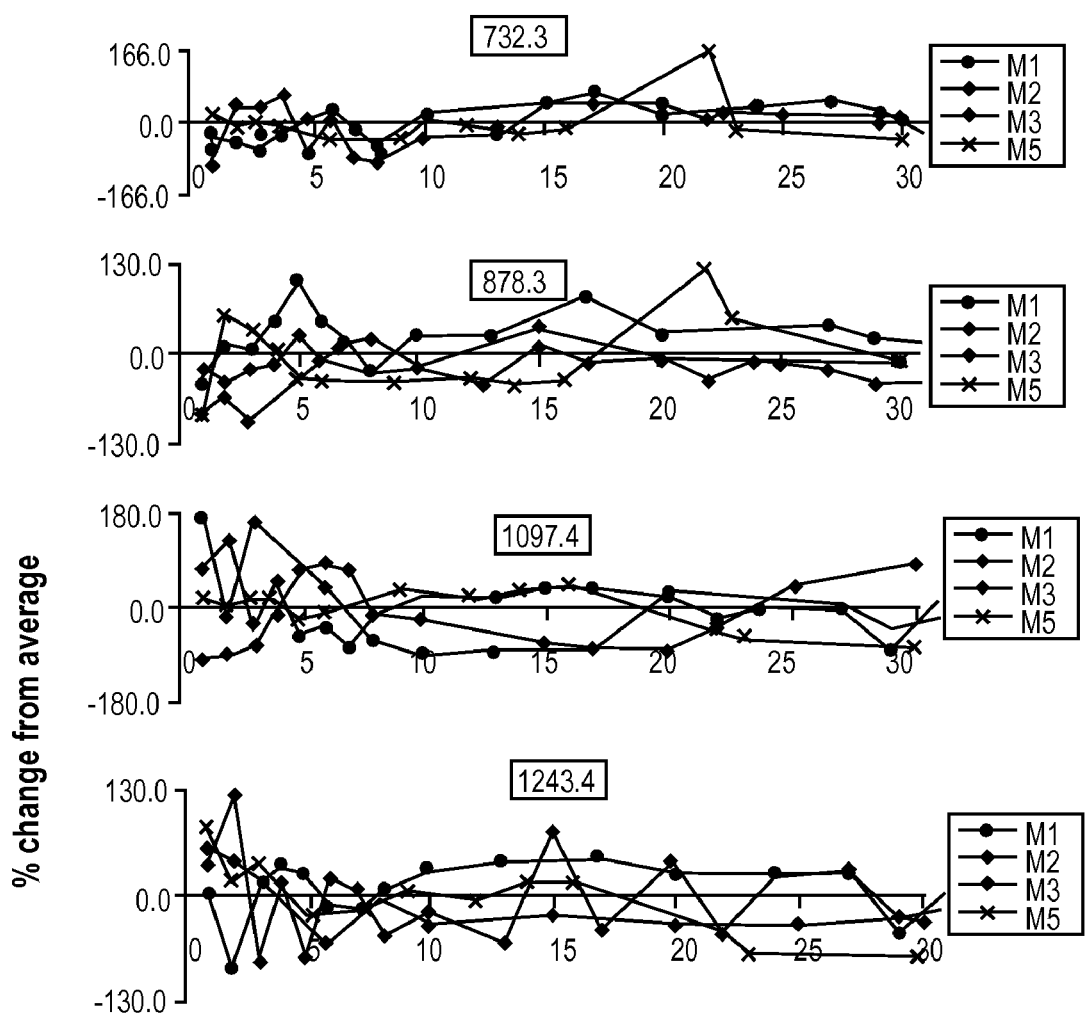
FIG. 5 illustrates flux of selected HMO throughout one month post-partum. Abundance data was normalized with respect to the mean abundance for each HMO monitored throughout the first month of lactation in each of four respective mothers. Data is shown as the percent difference from mean value. HMOs monitored m/z: 732.3, 878.3, 1097.4, 1243.4.
Figure 6:
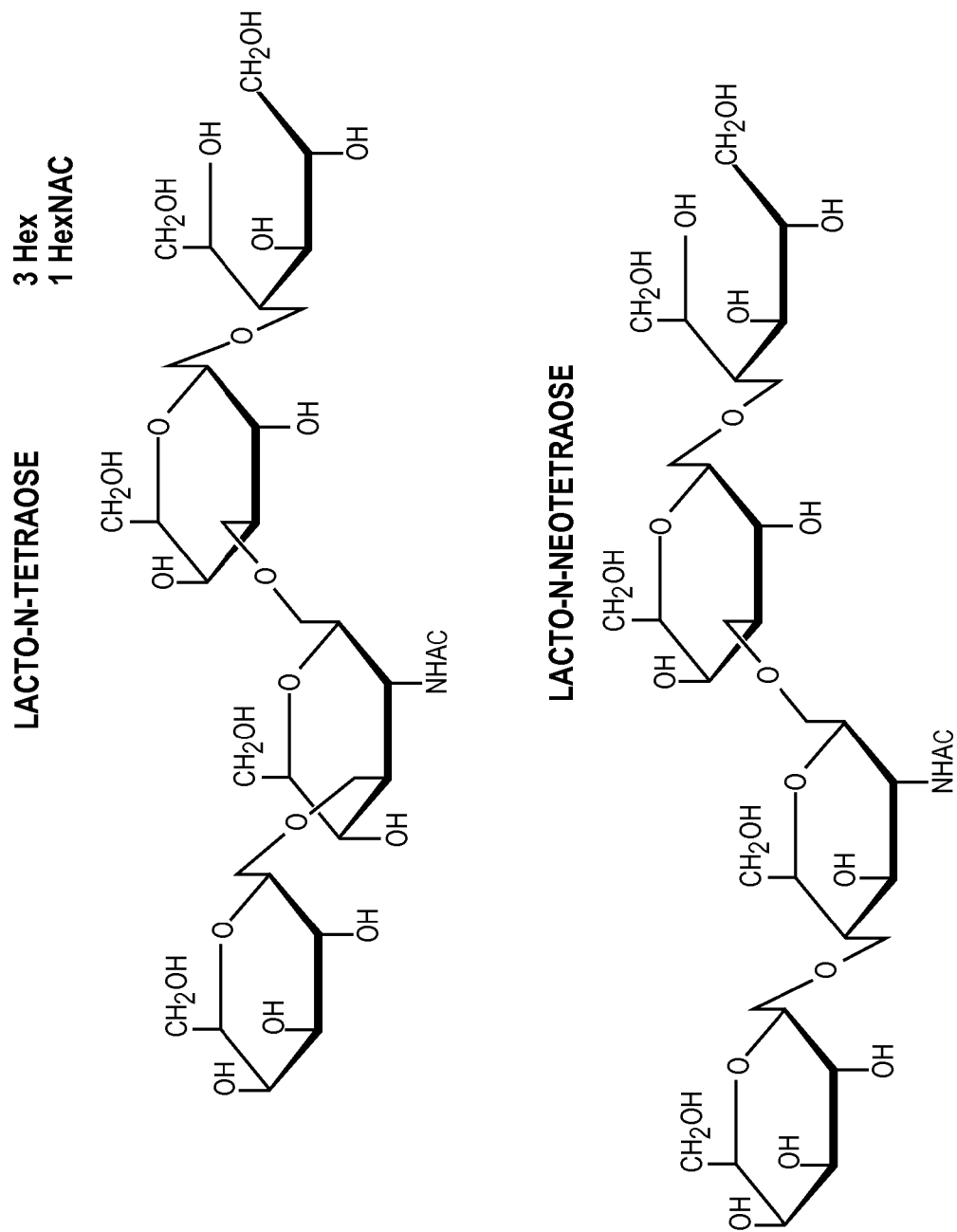
FIGS. 6-15 show the structures of additional HMO isomers consumed by *B. longum* bv. *infantis*, not represented in FIG. 3. Shown in these figures are all the known HMO structures from pooled human milk, as profiled by nanoESI-FT-ICR (+) MS. The abundance and consumption/production levels of these HMO are presented in FIG. 2a-d.
Figure 7:
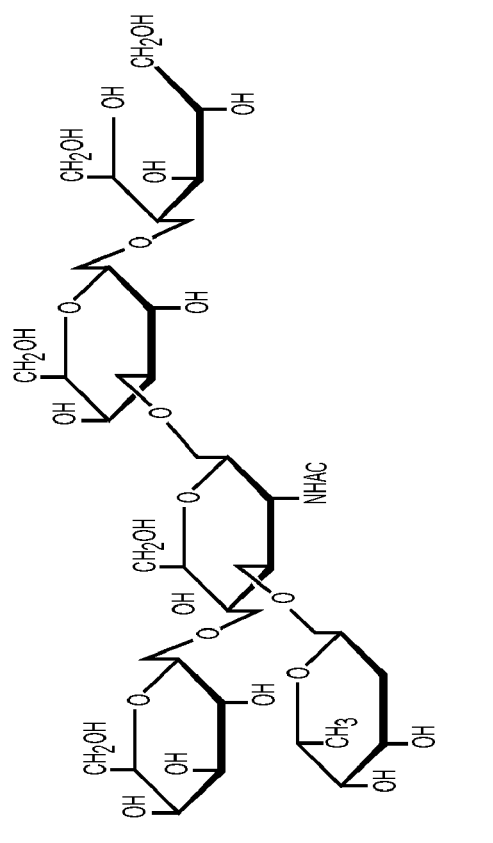
Figure 7:
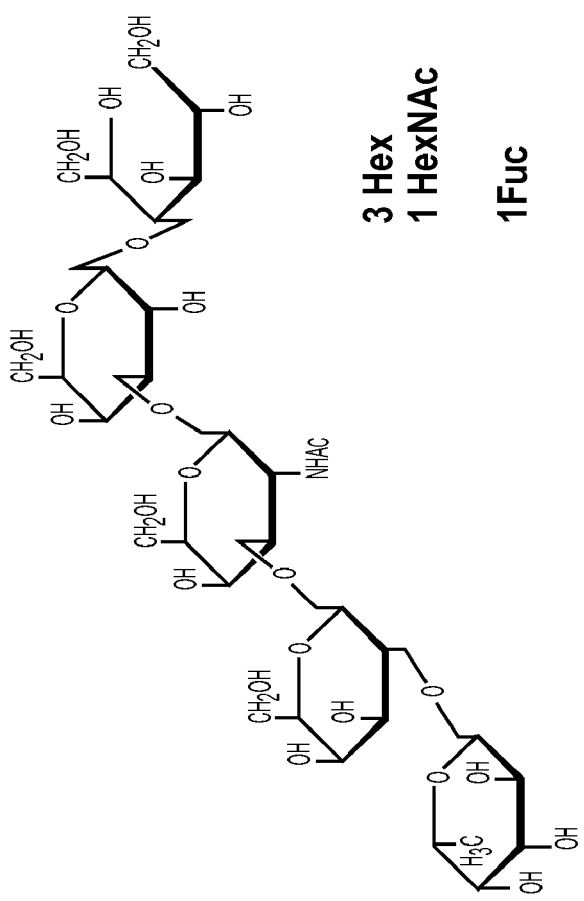
Figure 7:
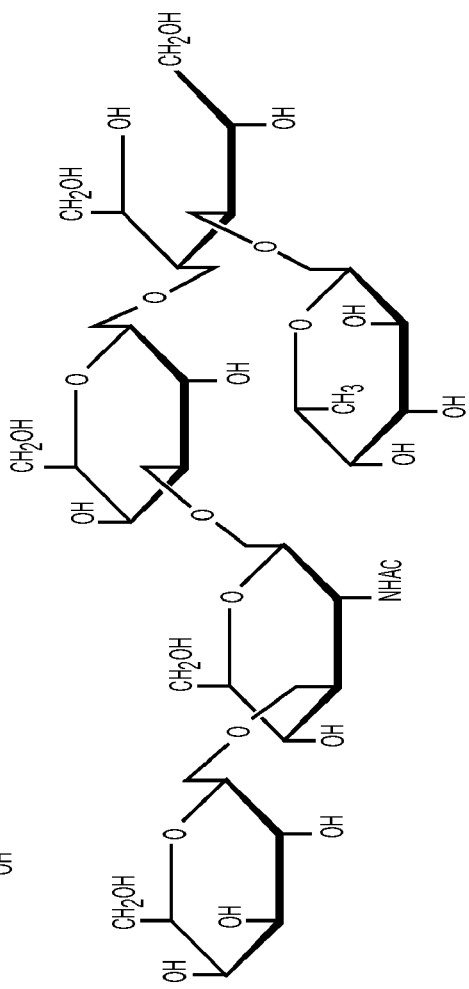
Figure 7:
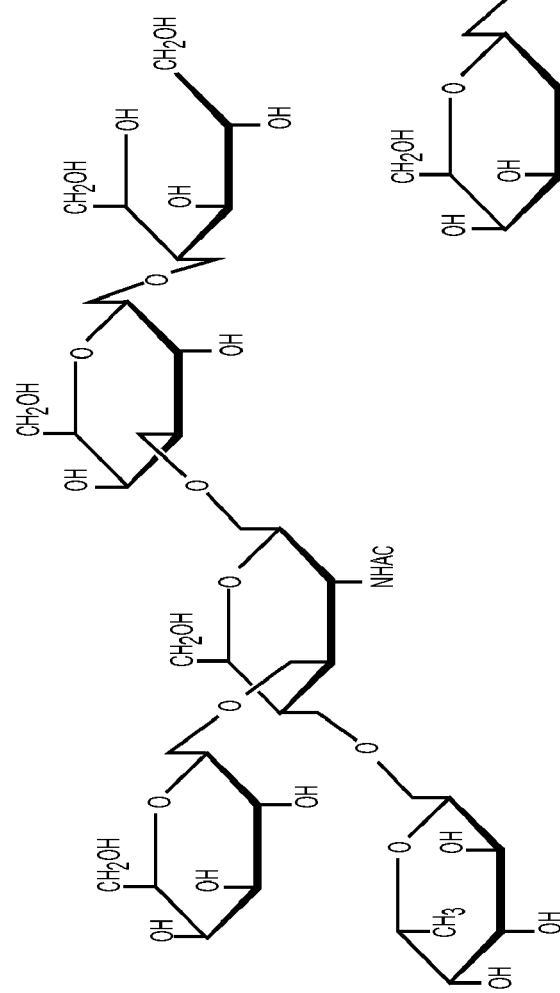
Figure 8:
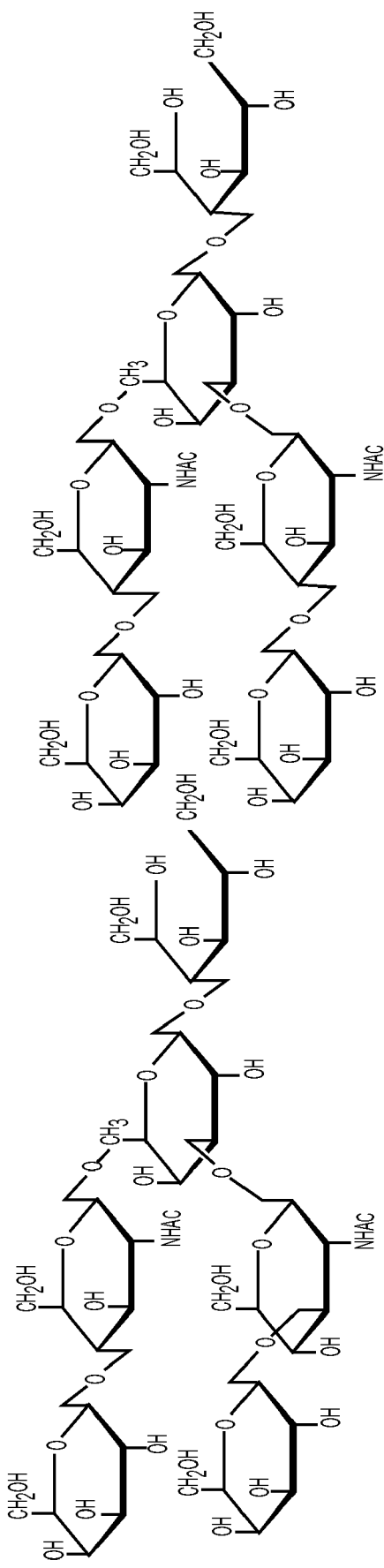
Figure 8:
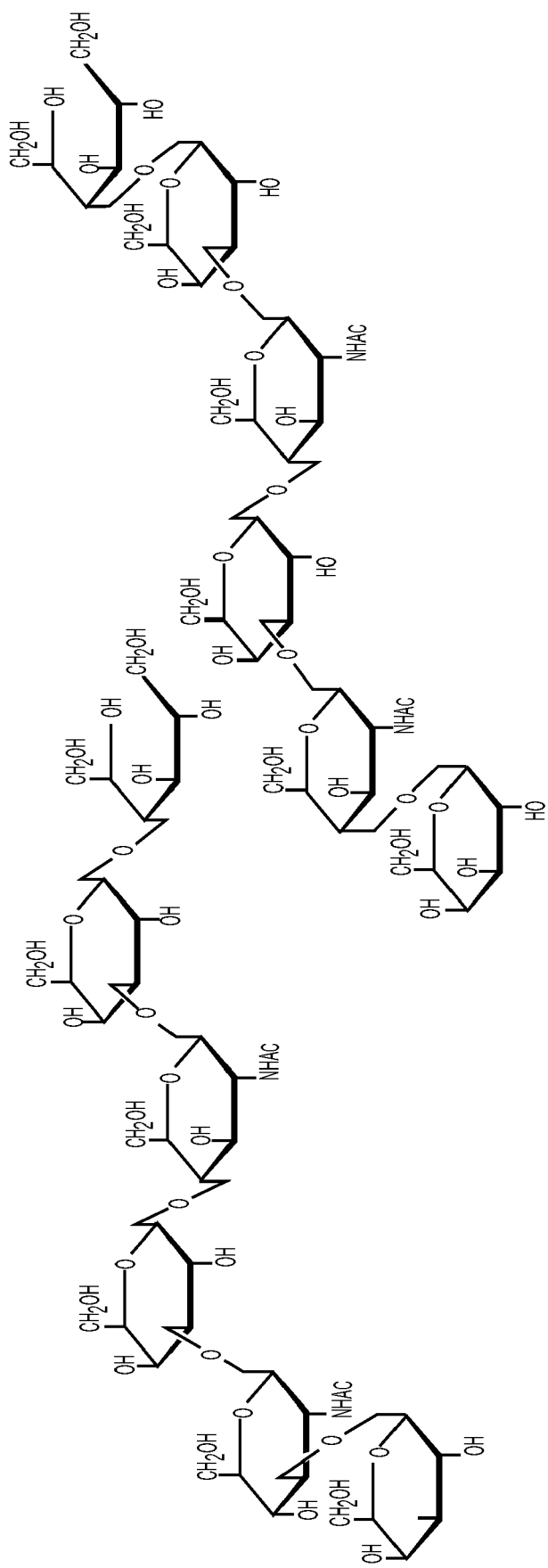
Figure 9:
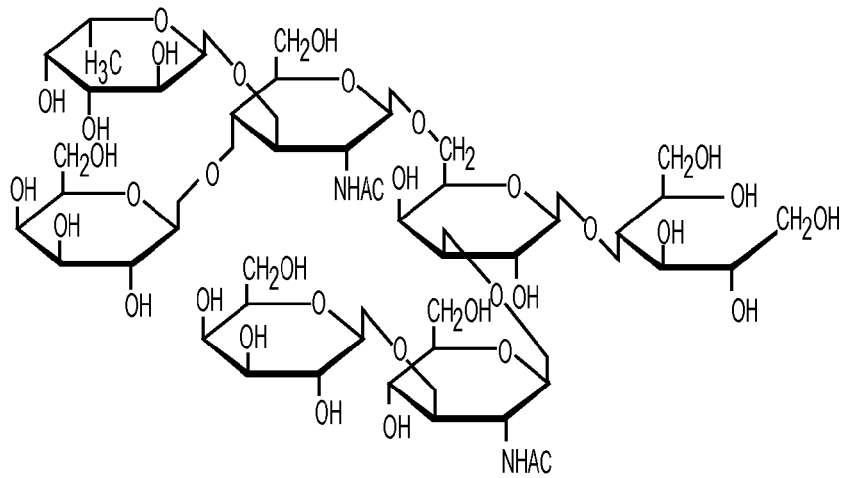
Figure 9:
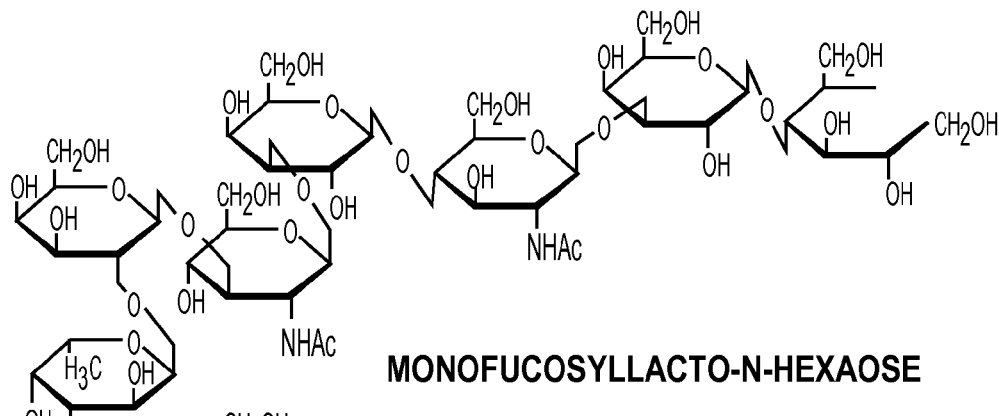
Figure 9:
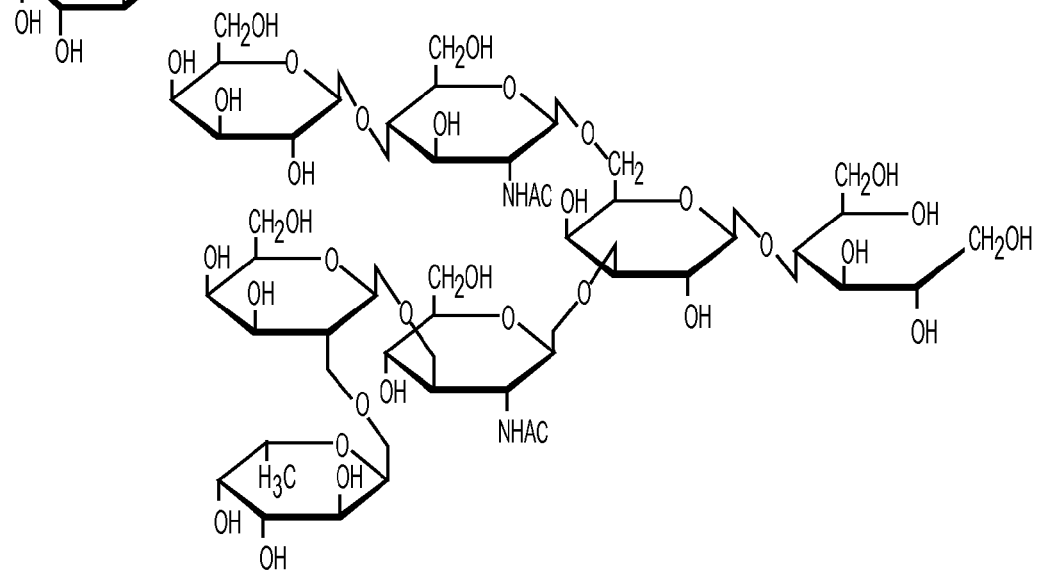
Figure 9:
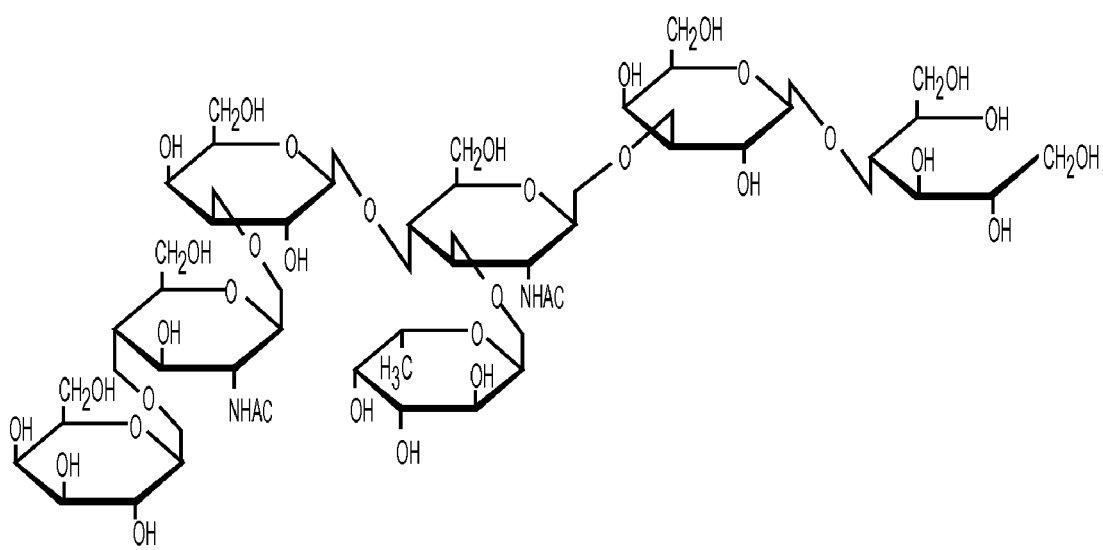
Figure 9:
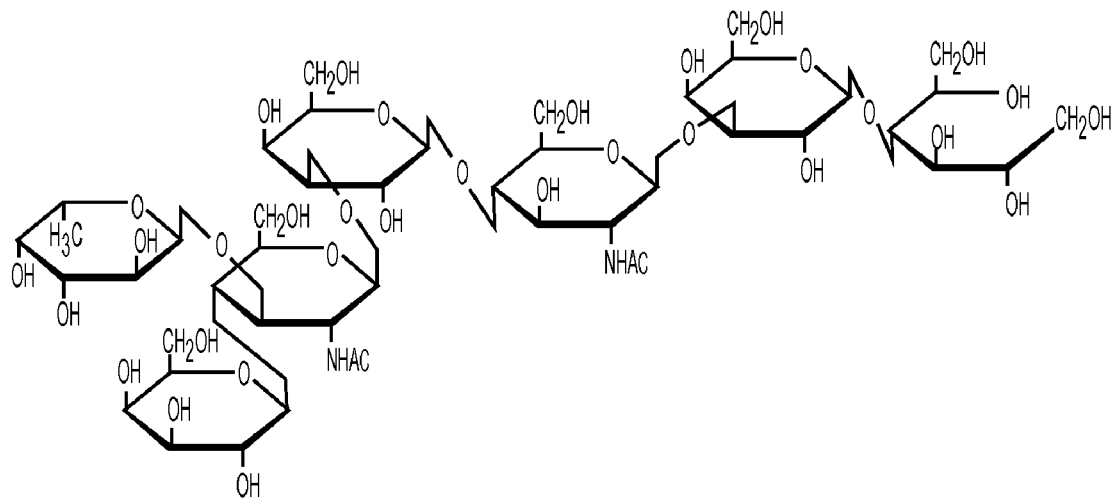
Figure 10:
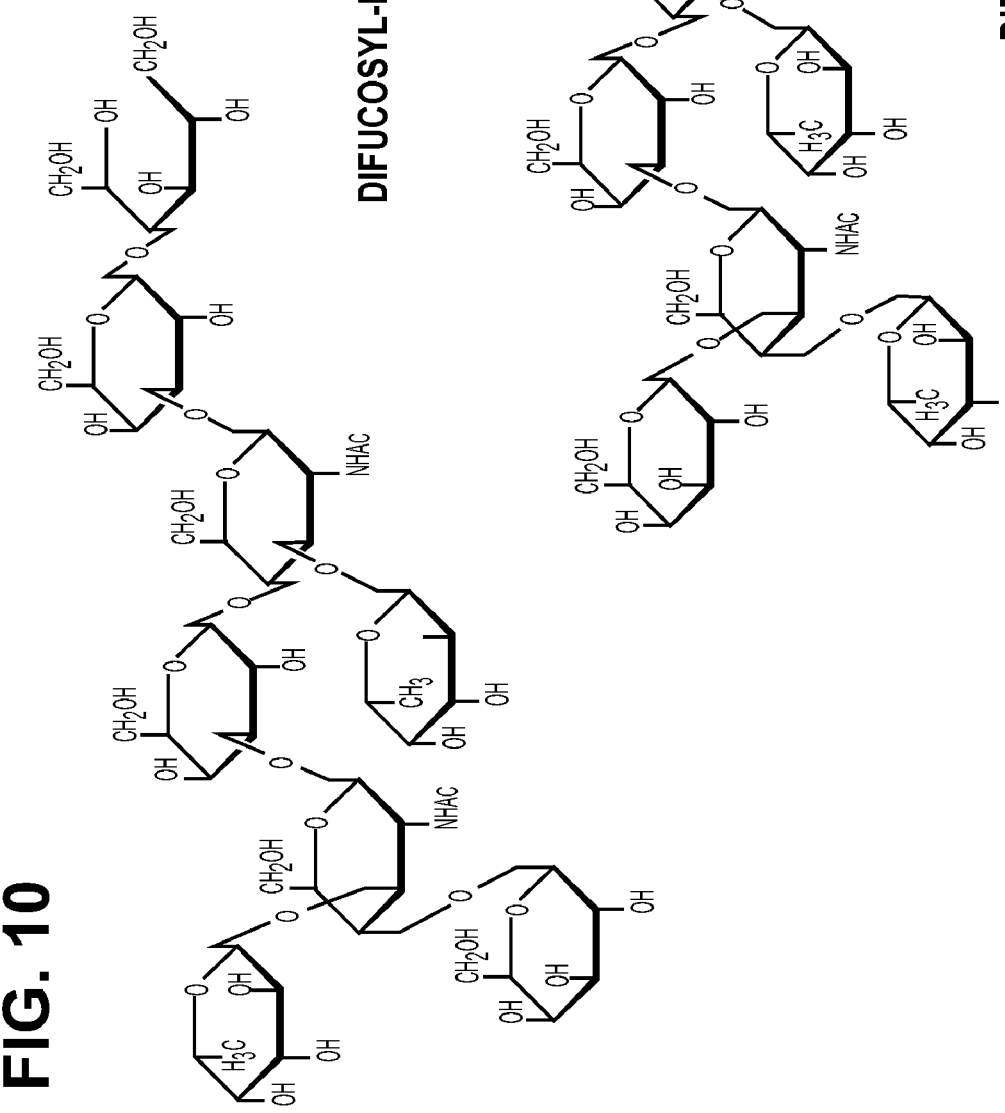
Figure 10:
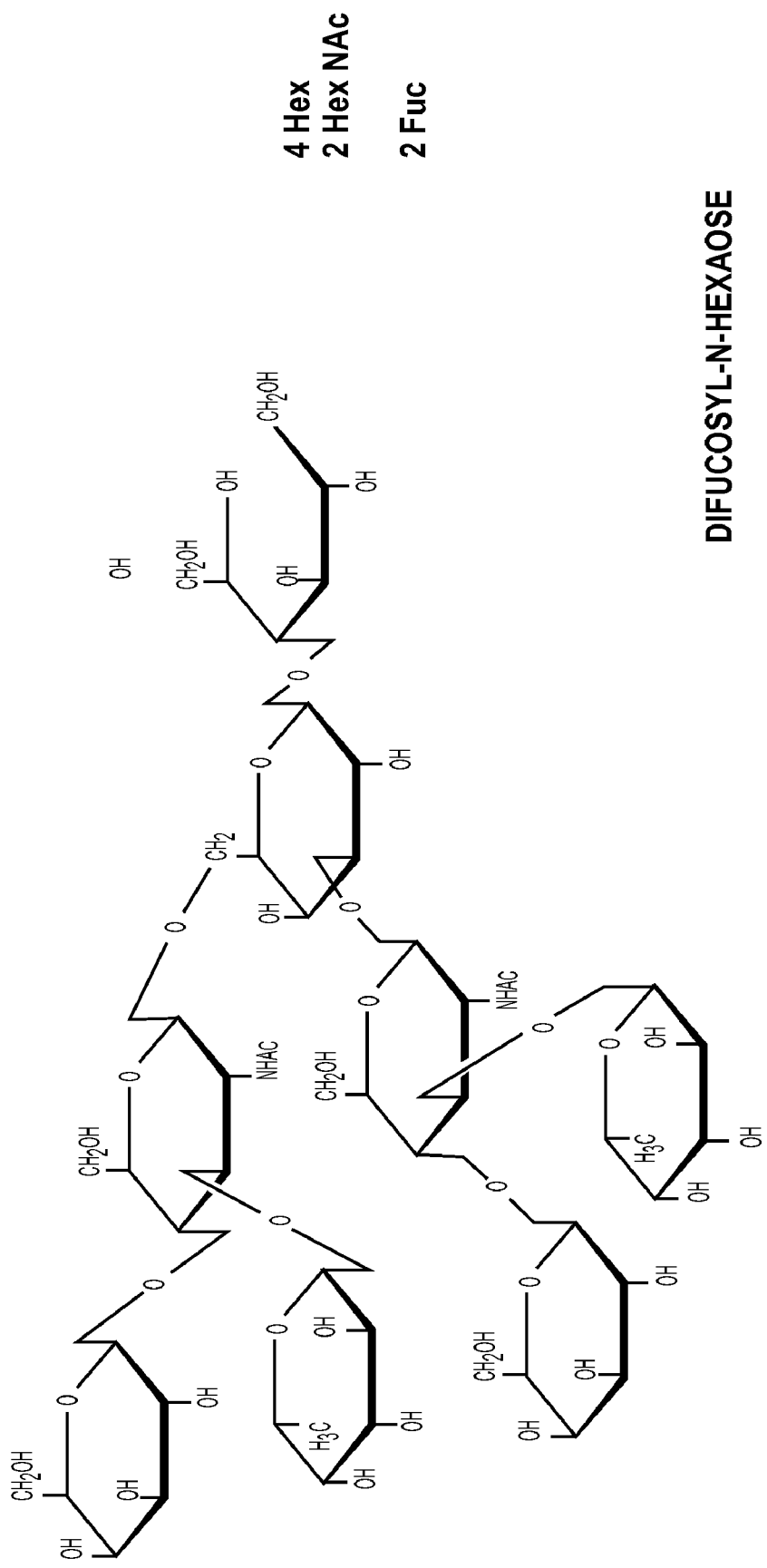
Figure 11:
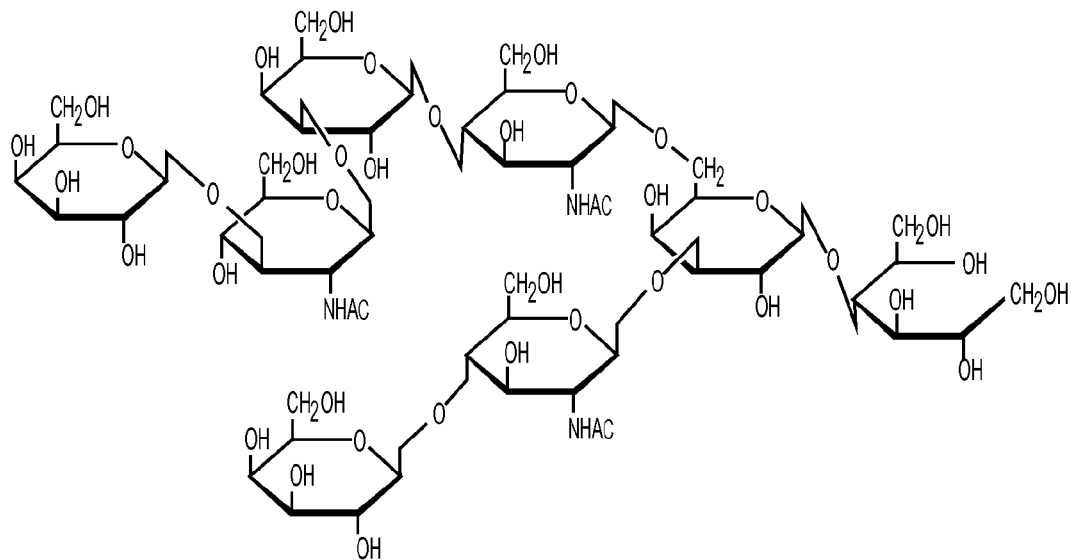
Figure 11:
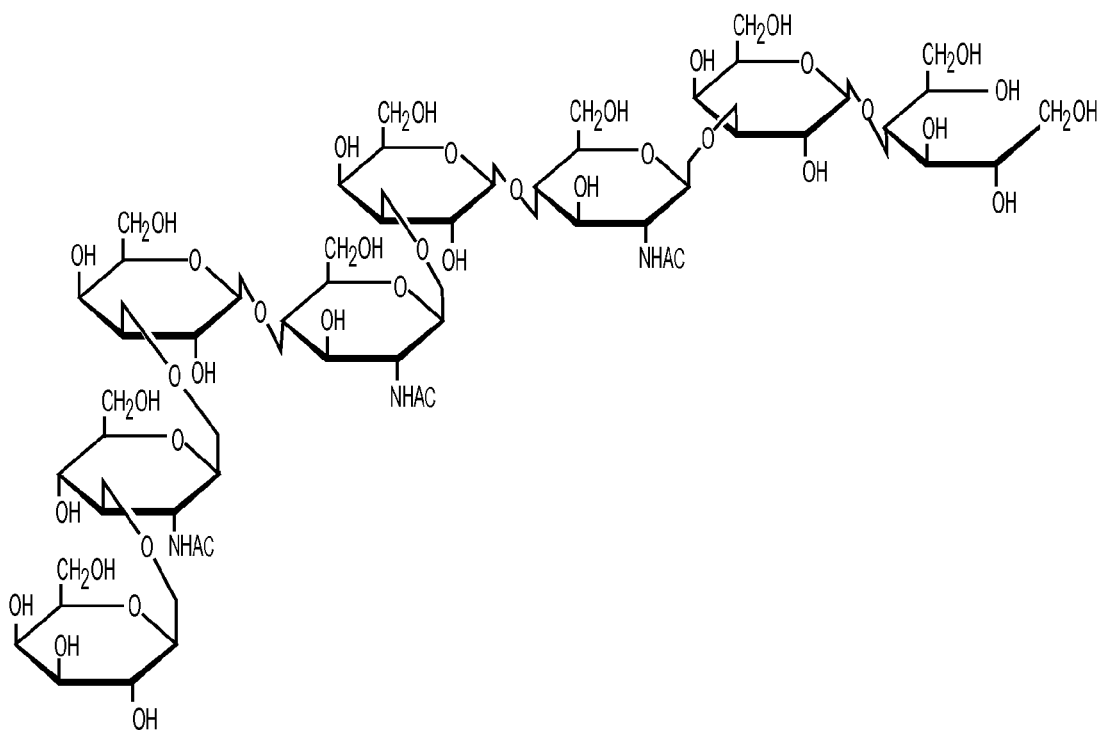
Figure 11:
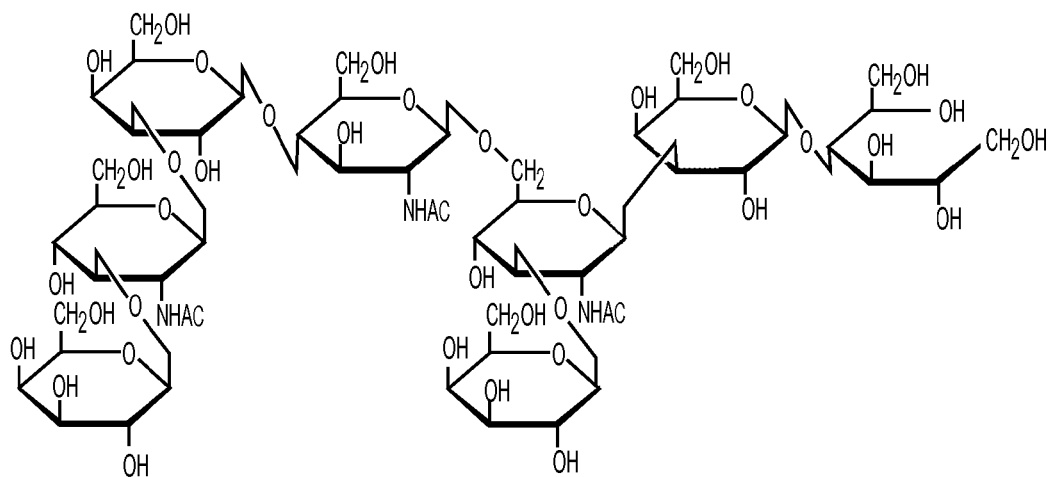
Figure 11:
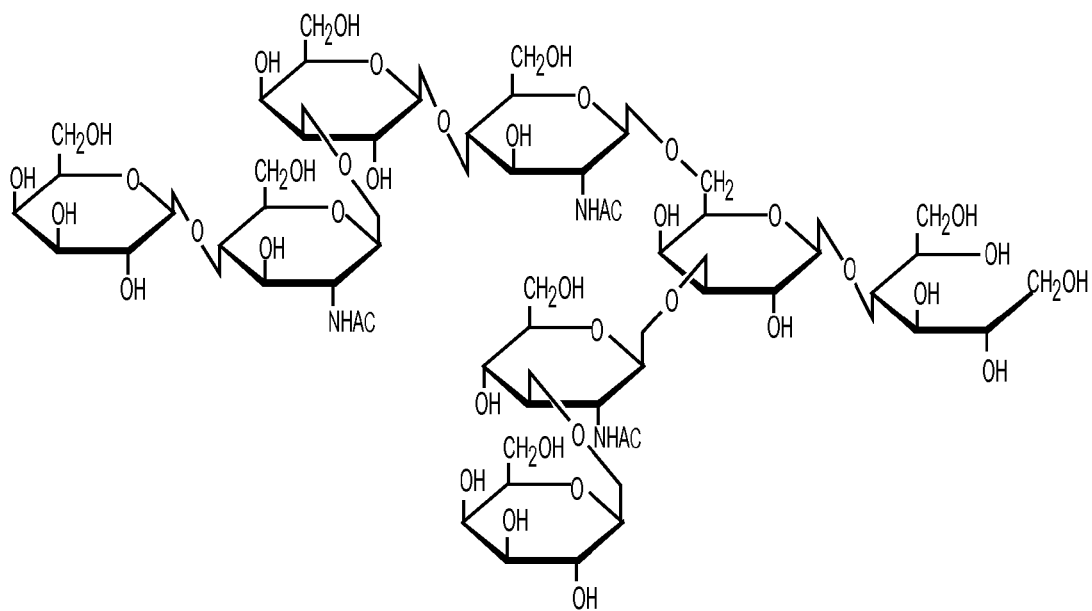
Figure 12:
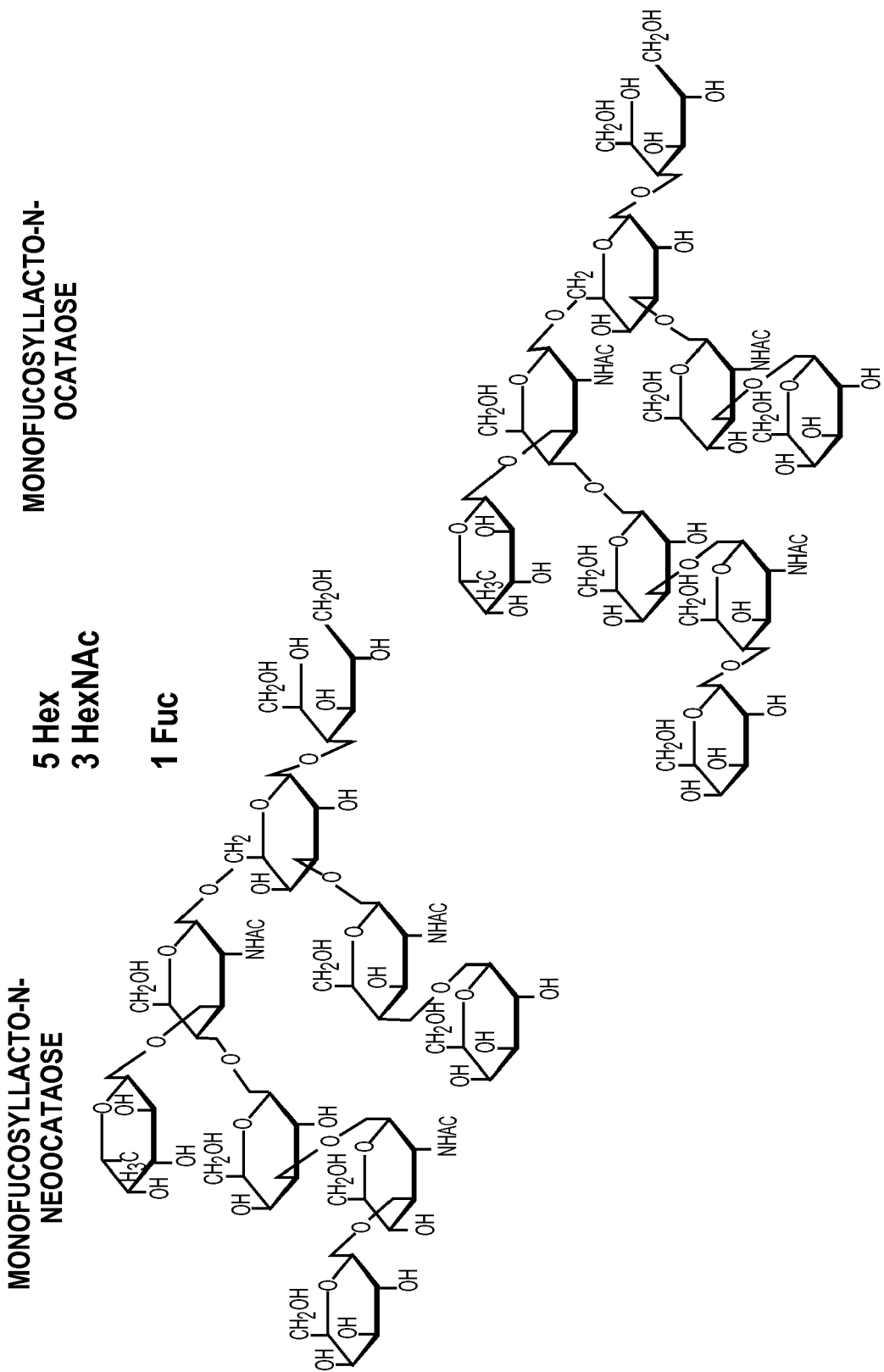
Figure 13:
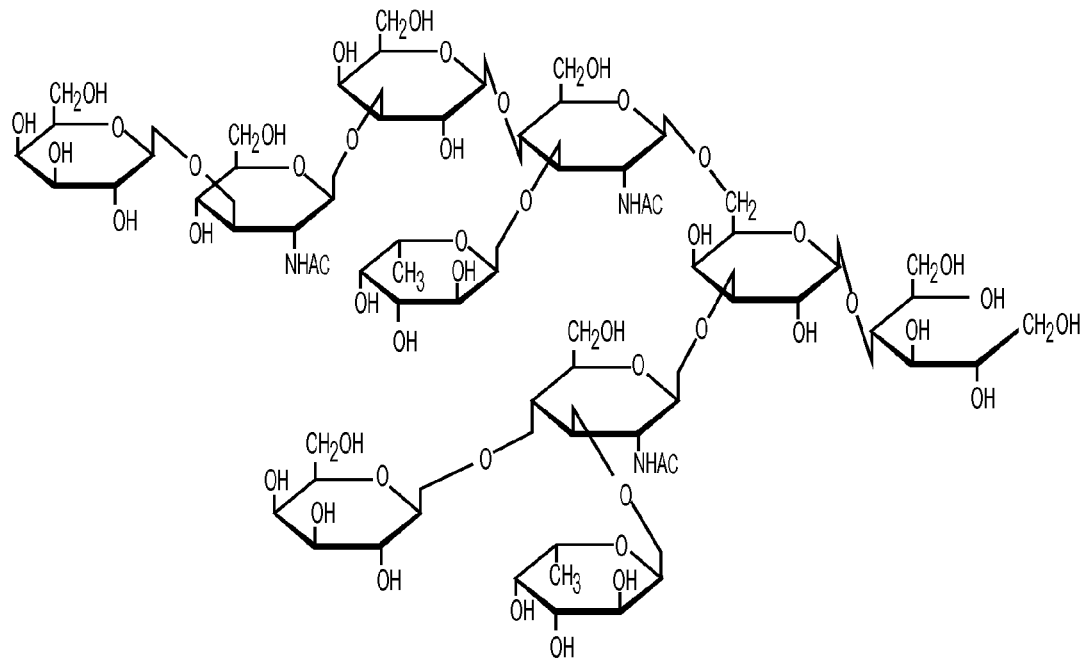
Figure 13:
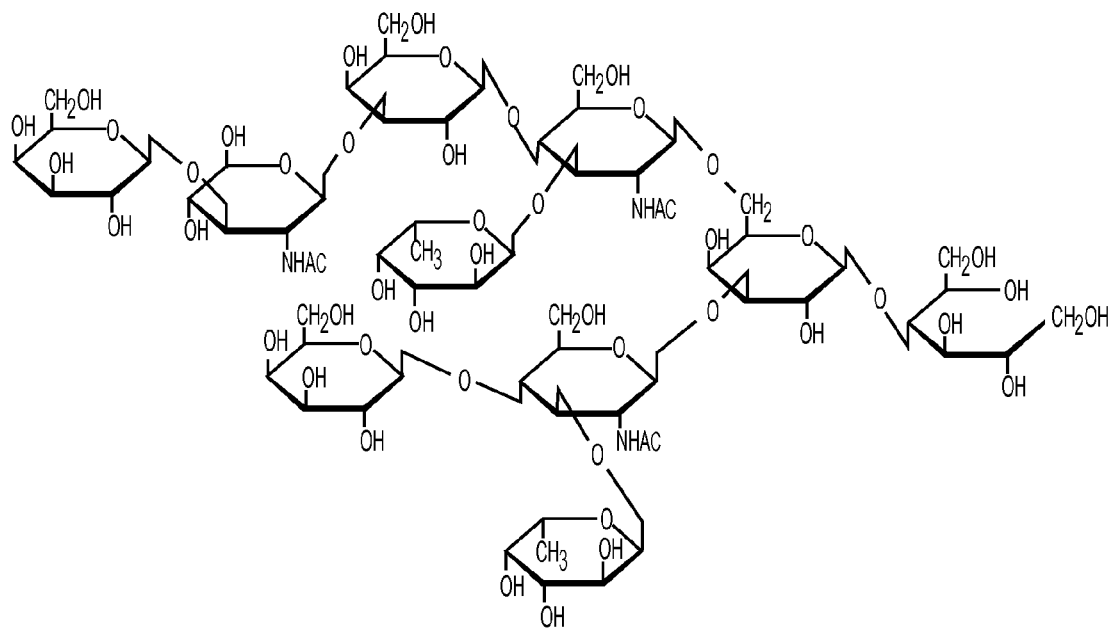
Figure 14:
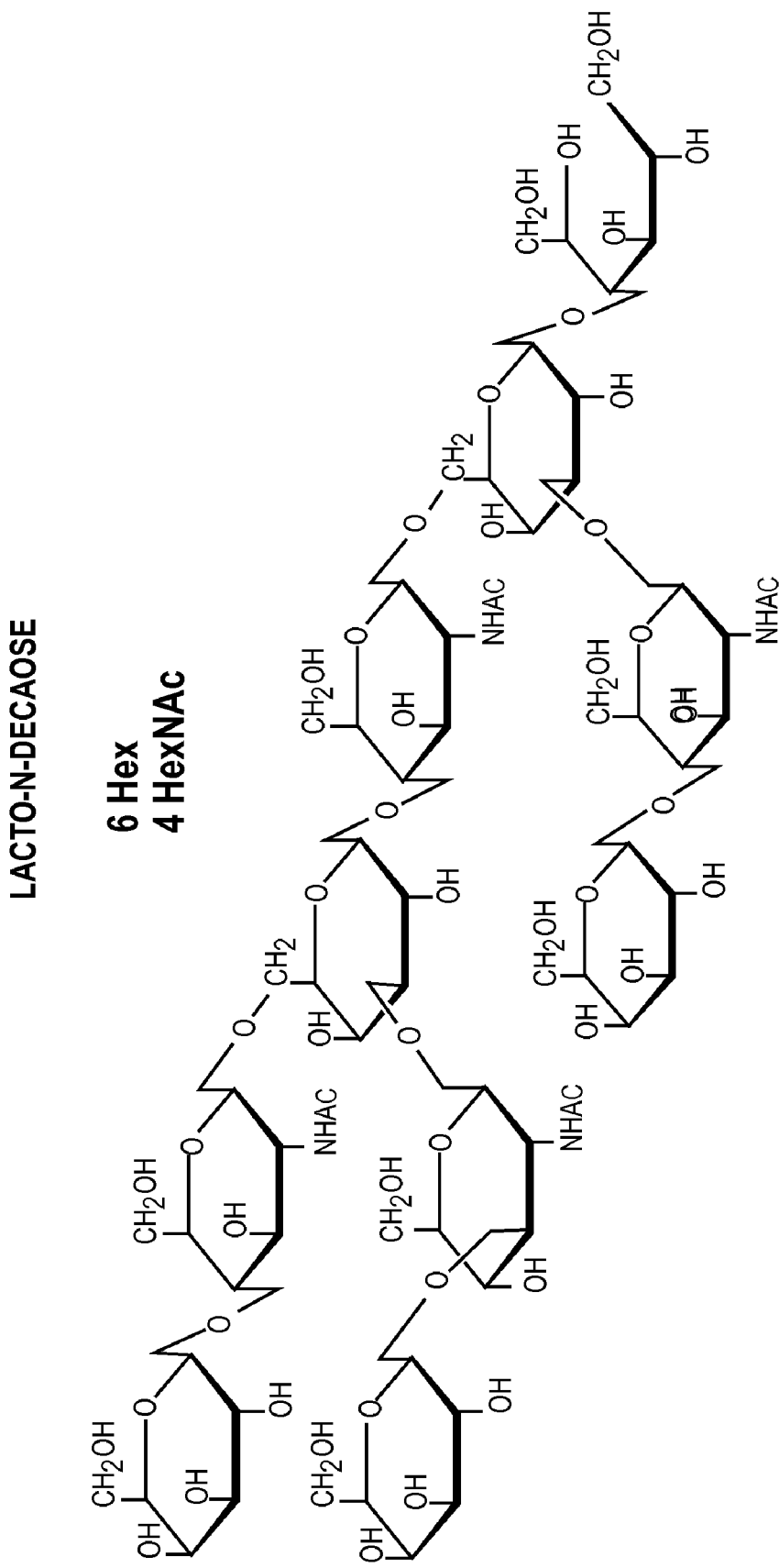
Figure 15:
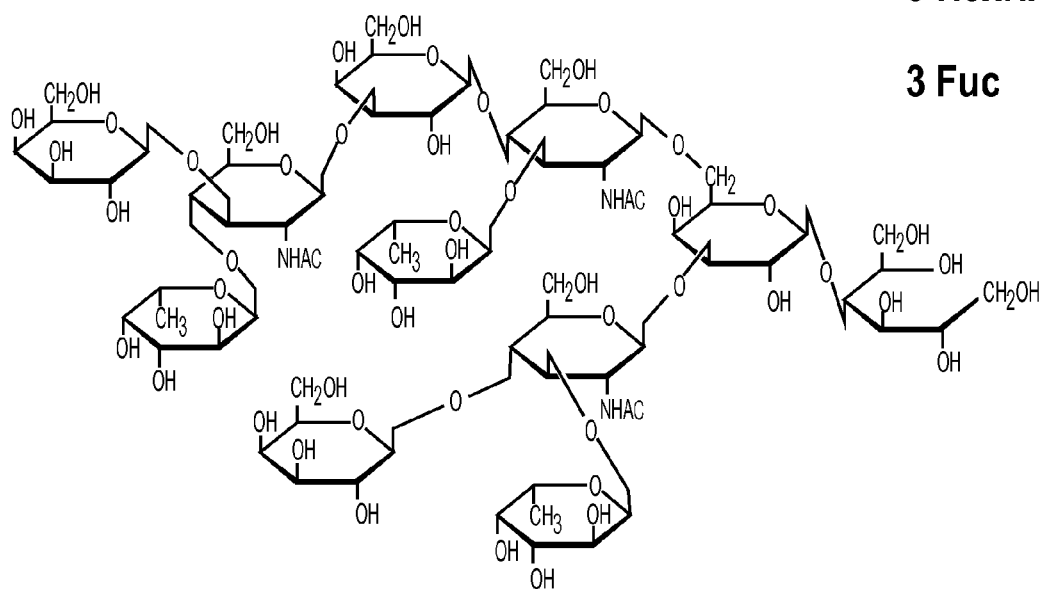
Figure 15:
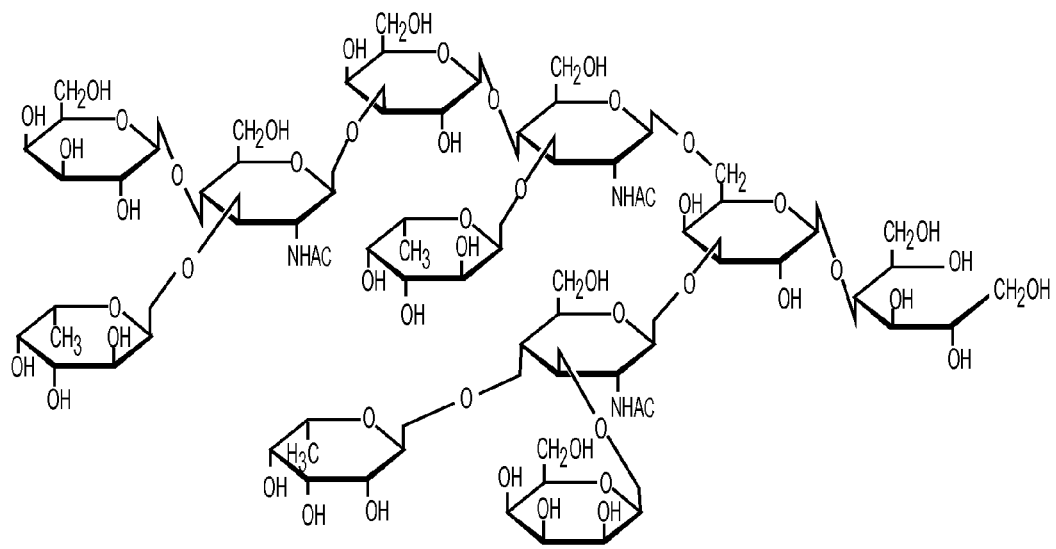
Figure 15:
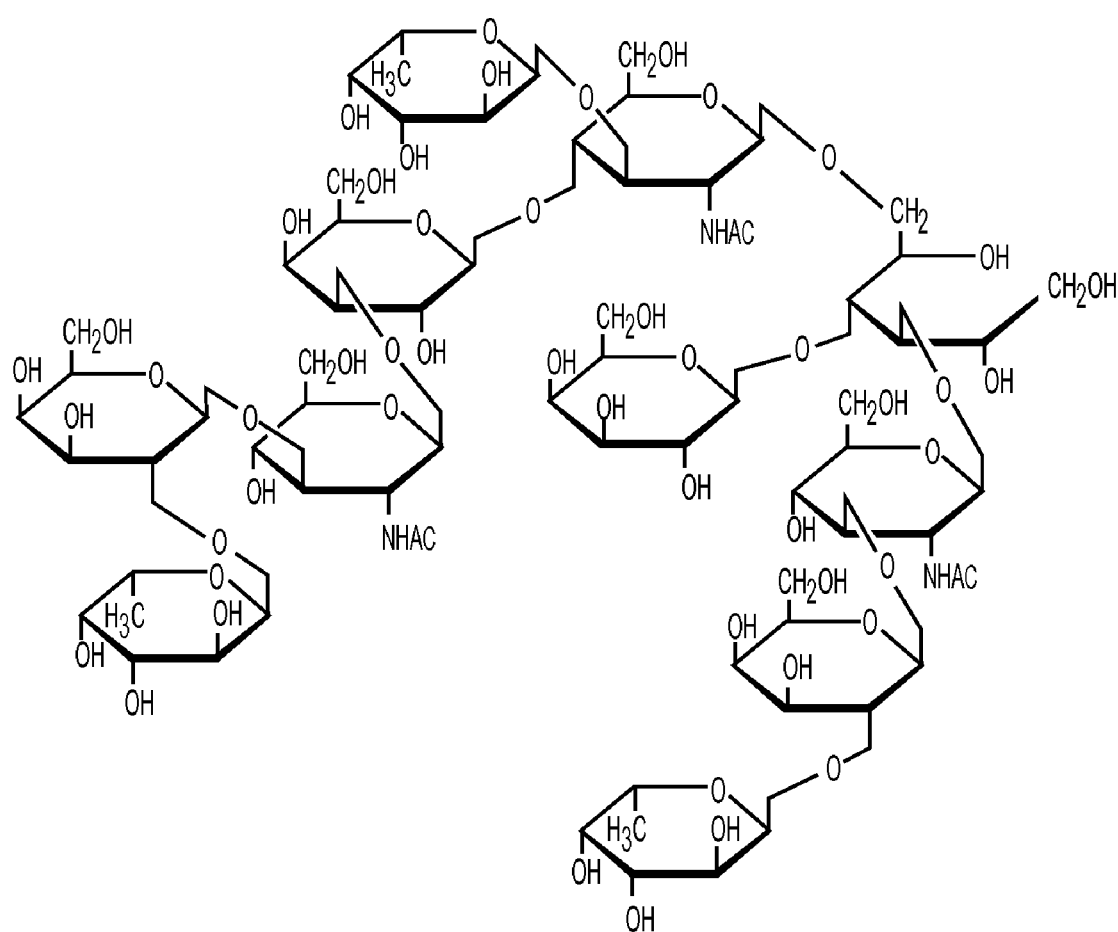
Figure 16:
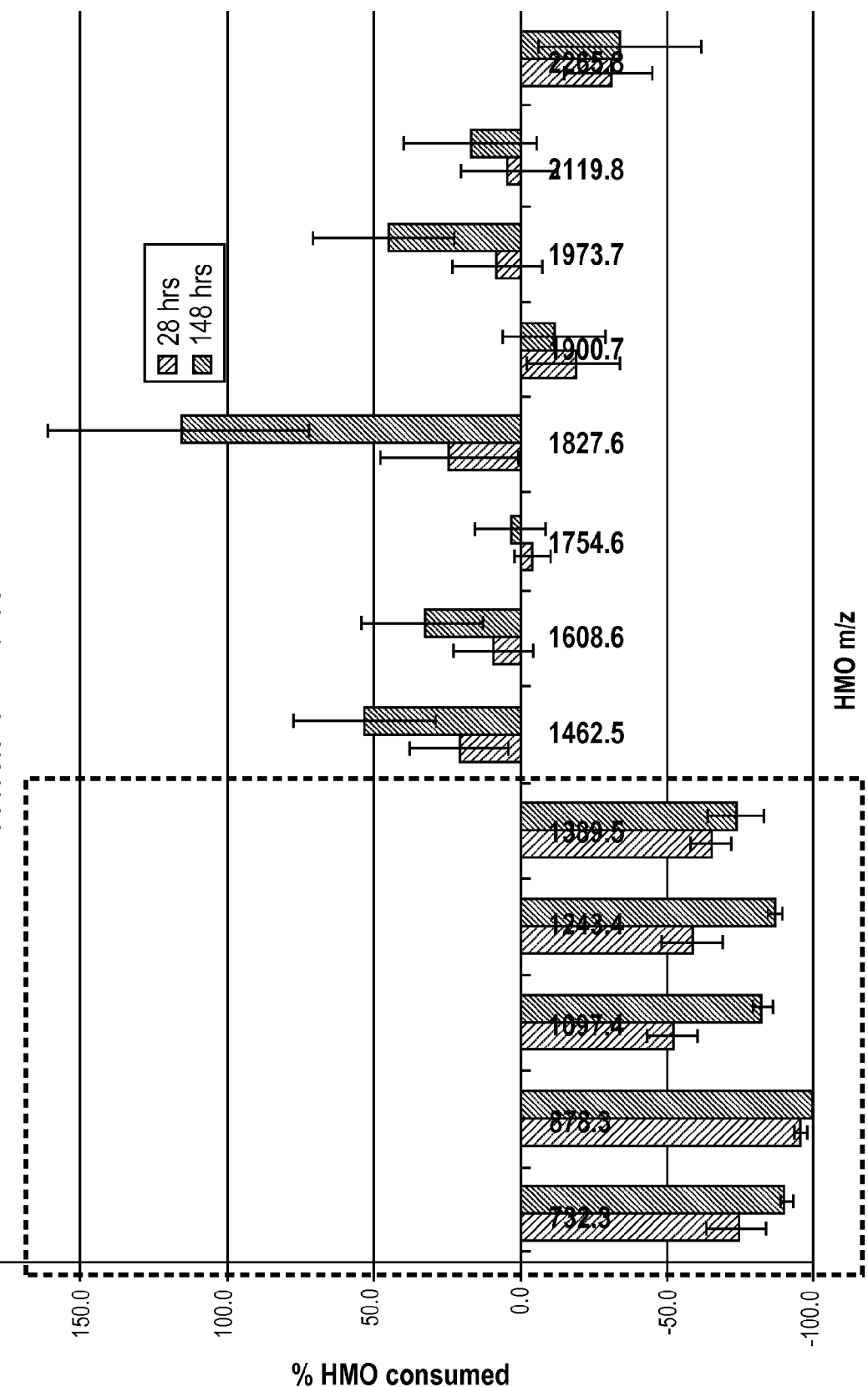
FIG. 16 shows HMO consumption glycoprofiling for *B. longum* bv. *infantis* ATCC 15697 as measured at T=28 hrs and 148 hrs.

To test whether *B. longum* bv. *infantis* preferentially consumed only HMOs species with a DP≦7, the consumption glycoprofiles were repeated under carbohydrate limiting conditions. This was achieved by performing growth studies in which HMO concentrations in the media were lowered from 2%, to 1.6, 0.8 and 0.4% (w/v), in the latter of which only minimal growth occurred (FIG. 4*a*). Upon limiting the availability of HMOs in the growth media, *B. longum* bv. *infantis* consumed almost all the available carbohydrate substrate including glycans with a DP>7 (FIG. 4*b*), which were previously only partially consumed (FIG. 2*b*). This indicates that *B. longum* bv. *infantis* preferentially consumed small mass HMOs (DP≦7) but it is nonetheless capable of metabolizing all of the available oligosaccharide substrates.

Figure 2E:
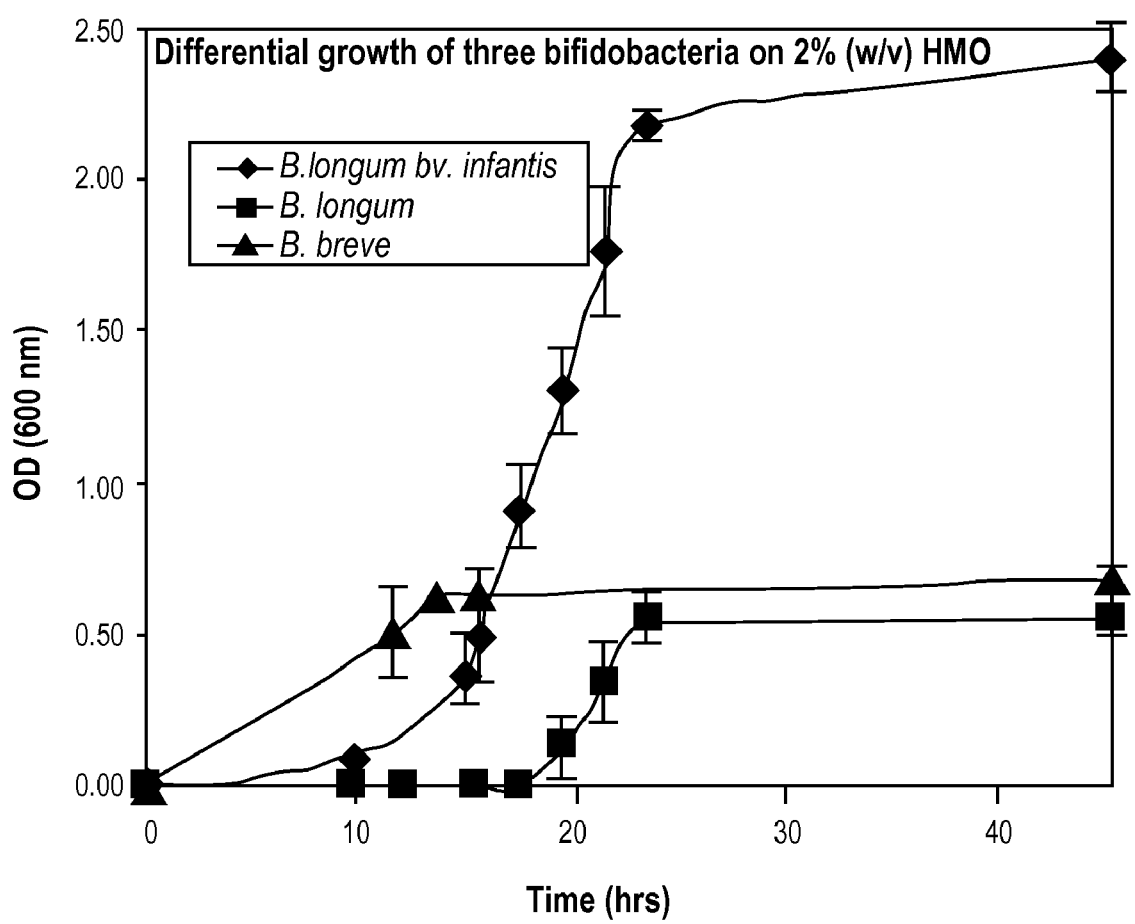
Figure 3:
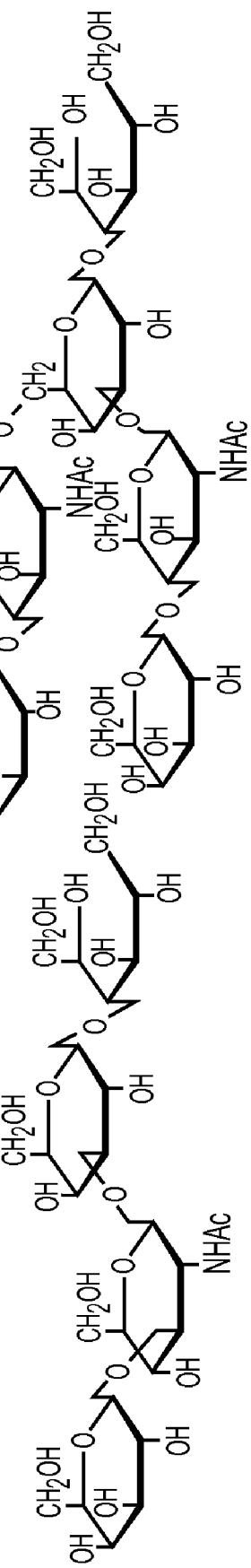
FIG. 3 illustrates structures of the most abundant HMO consumed by *B. longum* bv. *infantis* ATCC 15697.
Figure 3:
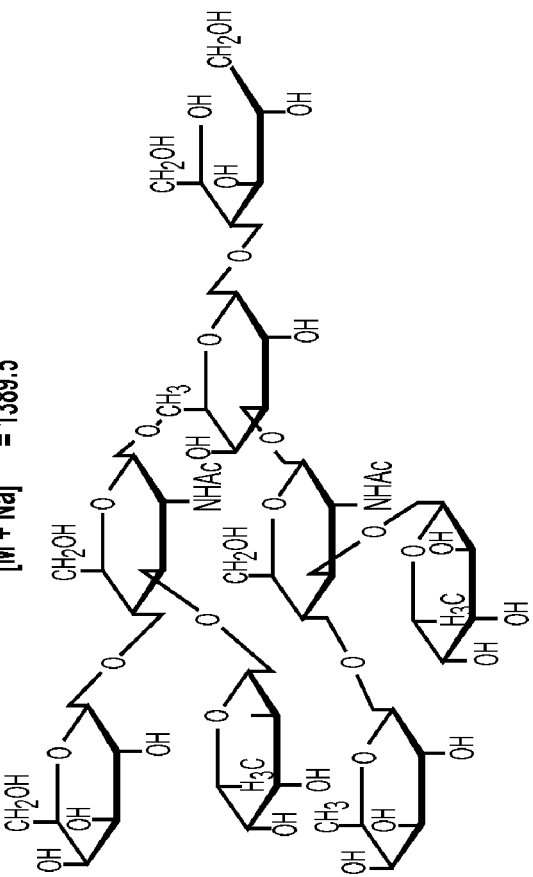
Figure 3:
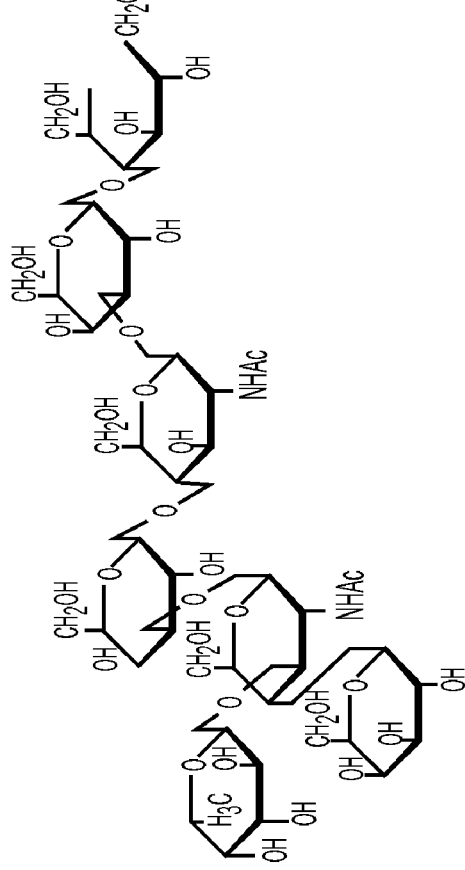

Catabolic capacity of these bacteria towards HMOs metabolism can be also measured by monitoring the sialidase and fucosidase activities required to deconstruct these complex glycan structures. Enzymatic assays showed that *B. longum* bv. *infantis* has a 16.6- and 33.7-fold higher sialidase activity when grown on lactose as compared respectively to *B. longum* and *B. breve*. Even though we cannot exclude a minimal/non-specific sialidase activity in *B. longum* and *B. breve*, this data suggests that *B. longum* bv. *infantis* has an inherent and constitutive ability to process sialylated compounds. Furthermore, among the three strains tested, fucosidase activity was only present in *B. longum* bv. *infantis* and was only detected upon growth on HMO (see Table 3). The marked differences in the ability to consume HMO correlate with the enzymatic activities observed for the three strains, and are clearly reflected in their growth patterns (FIG. 2*e*) which demonstrate that *B. longum* bv. *infantis* has an underlying genetic component enabling its rapid growth on HMOs. Noticeable increases in the abundance of glycans with higher DP (FIG. 2 *b/c/d*), were interpreted to be generated by bifidobacterial neuraminidases acting on sialylated HMOs. This is supported by evidence that among the three strains tested, only *B. longum* bv. *infantis* is capable of releasing sialic acids bound to HMO (data not shown) due to its sialidase activity (see Table 2).

TABLE 3

|  | Sialidase (nmol/min/mg protein) | | Fucosidase (nmol/min/mg protein) | |
| --- | --- | --- | --- | --- |
|  | lactose | HMO | lactose | HMO |
| B. infantis ATCC 15697 | 10.8 ± 1.0 | 4.8 ± 0.7 | ND | 0.45 ± 0.04 |
| B. longum DJO10A | 0.65 ± 0.03 | NA | ND | NA |
| B. breve ATCC 15700 | 0.32 ± 0.03 | NA | ND | NA |

ND—Not detected
NA—Not available (not enough cell growth)

Example 4

Abundance of HMOs in Human Breast Milk

If short HMOs (DP<7) are the factor responsible for seeding the bifidobacteria microbiota that becomes characteristic of breast-fed infants in the first month postpartum (Favier et al., Applied and Environmental Microbiology (2002) 68, (1), 219-226), then these glycans would be expected to be present in breast milk throughout this period. For this purpose we surveyed the presence of the most abundant HMOs in the breast milk of four lactating women using high performance liquid chromatography-chip time-of-flight (HPLC-Chip TOF). This employed a nanoLC separation MS technique using porous graphitized carbon as a separating column to separate structural HMO isomers (Packer et al., Glycoconjugate Journal (1998) 15, (8), 737-747). As shown in FIG. 4, four of the HMO consumed by B. longum bv. infantis are present immediately from the commencement and well throughout the first month of lactation. The presence of these oligosaccharides through this period of lactation and infant development thus provides the infant gut with the necessary prebiotic substrates needed to establish, maintain and select a specific microbiota. Although fluctuations among different mothers in specific glycans were detected, generally a constant flux of small molecular weight HMO from mother to infant is maintained.

Discussion

The differential glycoprofiles and growth on HMO observed for these representative bifidobacteria species, (FIG. 2 b/c/d), documents that growth on human milk oligosaccharides is not a property of all bifidobacteria. These results provide molecular and mechanistic evidence that specific strains of bifidobacteria consume selected classes of HMOs, suggesting that through this mechanism human milk and bifidobacteria have co-evolved to their mutual advantage. That is, the diversity of specific oligosaccharide structures found within human milk has evolved not to provide direct nutrition to the infant, but to act as specific substrates for sustaining growth of selected beneficial bacteria to aid in the development and protection of the newborn. In the case of B. longum bv. infantis, this strain has the ability to preferentially consume the most abundant HMOs. Modern infant formulas are increasingly supplemented with plant oligosaccharides which elicit an unspecific bifidogenic response (Fanaro et al., Acta Paediatrica (2005) 94, 22-26), lack the complexity and diversity of HMO, and are therefore unlikely to successfully mimic the structure-specific effects of HMO. Revealing the role of this key bioactive component of human breast milk advances our understanding of the biological function of breastfeeding for sustaining infant health and for providing long term benefits to human health. The results of the studies presented herein have been applied to the development of prebiotic and probiotic compositions and formulations of the present invention for improving infant health by providing compositions for the establishment of beneficial protective microbial communities. The compositions of the invention are also applicable to different stages of human life and health states.

Example 5

Various B. infantis Strains Consume HMOs

A number of strains of B. infantis as well as several different Bifidobacteria species were tested for their ability to consume human milk oligosaccharides (HMO) in aggregate. Table 4 summarizes the data obtained. Table 4 shows the growth of several Bifidobacteria strains on MRS media supplemented with 1.6% (w/v) HMO. Growth measured as optical density (OD) of the media at 600 nm. Fermentations were carried out in triplicate; controls consisted of inoculated medium lacking HMO and un-inoculated medium containing HMO which was also used as a blank for OD measurements. All strains were obtained from the Culture Collection in the Dept. of Viticulture & Enology at the University of California—Davis.

TABLE 4

| Strain | | Max OD |
| --- | --- | --- |
| B. infantis | 272 | 1.12 |
| B. longum | 263 | 0.51 |
| B. breve | 264 | 0.44 |
| B. adolescentis | 265 | 0.08 |

Table 5 shows the percent of specific HMO (designated by m/z ratio) consumed by several strains grown on a MRS media supplemented with 1.6% (w/v) HMO. Measurements are triplicates of individual biological and technical replicates. Shaded data=not a statistically significant consumption of HMO.

TABLE 5

| HMO | % HMO Consumed | | | |
| --- | --- | --- | --- | --- |
| m/z | Strain 264 | Strain 263 | Strain 265 | Strain 272 |
| 732.25 | 64.69 | 51.15 | 8.10 | 94.20 |
| 878.31 | 20.89 | 11.45 | 17.22 | 97.54 |
| 1097.39 | 17.64 | 32.70 | 15.92 | 82.82 |
| 1243.44 | 18.97 | 30.13 | 17.42 | 90.58 |
| 1389.50 | 21.36 | 4.53 | 14.56 | 92.27 |
| 1462.52 | 15.13 | 43.89 | 2.61 | 37.94 |
| 1608.58 | 23.41 | 38.39 | 15.55 | 40.09 |
| 1754.63 | 23.00 | 26.33 | 9.08 | 39.03 |

It is understood that the examples and embodiments described herein are for illustrative purposes only and that various modifications or changes in light thereof will be suggested to persons skilled in the art and are to be included within the spirit and purview of this application and scope of the appended claims. All publications, patents, and patent applications cited herein are hereby incorporated by reference in their entirety for all purposes.

What is claimed is:

1. A synthetic prebiotic composition comprising a first, second and third purified oligosaccharide each of which naturally occur in human breast milk, wherein the first oligosaccharide has a mass/charge (m/z) ratio of about 732.3; the second oligosaccharide has a mass/charge (m/z) ratio of about 1243.4; and the third oligosaccharide has a mass/charge (m/z) ratio of about 1389.5, wherein the m/z ratio is measured by matrix-assisted laser desorption/ionization (MALDI), and wherein the composition is consumed at a higher rate by *Bifidobacterium longum* bv. *infantis* (*B. infantis*) compared to other *Bifidobacterium* strains.

2. The synthetic prebiotic composition of claim 1, where in the first oligosaccharide is selected from the group consisting of Lacto-N-tetraose and Lacto-N-neotetraose; the second oligosaccharide is selected from the group consisting of Monofucosyllacto-N-hexaose, Isomeric Fucosylated Lacto-N-hexaose (1), Isomeric Fucosylated Lacto-N-hexaose (2), Isomeric Fucosylated Lacto-N-hexaose (3); and the third oligosaccharide is selected from the group consisting of Difucosyl-para-lacto-neohexaose, Difucosyl-para-lacto-hexaose, and Difucosyl lacto-hexaose.

3. The synthetic prebiotic composition of claim 1, further comprising a fourth oligosaccharide that naturally occurs in human breast milk and has a mass/charge (m/z) ratio of about 1097.4.

4. The synthetic prebiotic composition of claim 3, wherein the fourth oligosaccharide is selected from the group consisting of Lacto-N-hexaose, Lacto-N-neohexaose, Para-lacto-hexaose, and Para-lacto-neohexaose.

5. The synthetic prebiotic composition of claim 3, further comprising a fifth oligosaccharide that naturally occurs in human breast milk and has a mass/charge (m/z) ratio of about 878.3.

6. The synthetic prebiotic composition of claim 5, wherein the fifth oligosaccharide is selected from the group consisting of Lacto-N-fucopentaose I, Lacto-N-fucopentaose II, Lacto-N-fucopentaose III, and Lacto-N-fucopentaose IV.

7. The synthetic prebiotic composition of claim 1, further comprising an inoculum of *B. infantis*.

8. The synthetic prebiotic composition of claim 1, further comprising a bovine milk protein, a soy protein, betalactoglobulin, whey, soybean oil or starch.

9. The synthetic prebiotic composition of claim 1, wherein said prebiotic composition is in the form of a powder, a tablet, a capsule, a lozenge, a chewing gum, a food product, or a supplemented beverage.

10. The synthetic prebiotic composition of claim 9, wherein said supplemented beverage is a member selected from the group consisting of an infant formula, follow-on formula, toddler's beverage, milk, fruit juice, and fruit-based drink.

11. The synthetic prebiotic composition of claim 1, wherein said first, second and third oligosaccharide are each at a concentration of 100 micrograms/L to 25 grams/L.

12. A synthetic prebiotic composition comprising at least three purified oligosaccharides that naturally occur in human breast milk, wherein the oligosaccharides have a mass/charge (m/z) ratio selected from the group consisting of about 878.3, about 1097.4, about 1243.4, about 1389.5, about 1462.5, about 1608.6, about 1754.6, about 1827.6, and about 1900.7, wherein the m/z ratio is measured by matrix-assisted laser desorption/ionization (MALDI), and wherein the composition is consumed at a higher rate by *Bifidobacterium longum* bv. *infantis* (*B. infantis*) compared to other *Bifidobacterium* strains.

13. The synthetic prebiotic composition of claim 12, wherein the oligosaccharides are selected from the group consisting of Lacto-N-Tetraose, Lacto-N-Neotetraose, Lacto-N-Fucopentaose I, Lacto-N-Fucopentaose II, Lacto-N-Fucopentaose III, Lacto-N-Fucopentaose V, Lacto-N-Hexaose, Para-Lacto-N-Hexaose, Lacto-N-Neohexaose, Para-Lacto-N-Neohexaose, Monofucosyllacto-N-Hexaose II, Isomeric Fucosylated Lacto-N-Hexaose (1), Monofucosyllacto-N-Hexaose, Isomeric Fucosylated Lacto-N-Hexaose (3), Isomeric Fucosylated Lacto-N-Hexaose (2), Difucosyl-Para-Lacto-N-Neohexaose, Difucosyl-Para-Lacto-N-Hexaose, Difucosyllacto-N-Hexaose, Lacto-N-Neoocataose, Para-Lacto-N-Octanose, Iso-Lacto-N-Octaose, Lacto-N-Octaose, Monofucosyllacto-N-neoocataose, Monofucosyllacto-N-Ocataose, Difucosyllacto-N-Octaose I, Difucosyllacto-N-Octaose II, Difficosyllacto-N-Neoocataose II, Difucosyllacto-N-Neoocataose I, Lacto-N-Decaose, Trifucosyllacto-N-Neooctaose, Trifucosyllacto-N-Octaose and Trifucosyl-Iso-Lacto-N-Octaose.

14. The synthetic prebiotic of claim 12 or 13, comprising at least two, at least three, at least four or at least five oligosaccharides selected from the group.

15. The synthetic prebiotic composition of claim 12, further comprising an inoculum of *B. infantis*.

16. A method of producing a synthetic prebiotic food product or food supplement, the method comprising, combining at least one food ingredient with the first and second and third oligosaccharide of claim 1, thereby generating a prebiotic food product or food supplement.

17. The method of claim 16, wherein the food ingredient comprises a bovine milk protein, a soy protein, betalactoglobulin, whey, soybean oil or starch.

18. The method of claim 16, further comprising combining an inoculum of *B. infantis* with the food ingredient and/or first and second and third oligosaccharide.

19. The method of claim 16, wherein at least one of the first, second and third oligosaccharides are synthesized before the combining step.

20. The method of claim 16, wherein at least one of the first, second and third oligosaccharides are purified before the combining step.

* * * * *